US012467737B1

(12) United States Patent
Ferdman et al.

(10) Patent No.: US 12,467,737 B1
(45) Date of Patent: Nov. 11, 2025

(54) SELF-REFERENCING INTERFEROMETRIC MICROSCOPE

(71) Applicant: Camtek Ltd., Migdal Ha'emek (IL)

(72) Inventors: Boris Ferdman, Adi (IL); Tomer Gilad, Kiryat Tivon (IL)

(73) Assignee: Camtek Ltd., Migdal Ha'emek (IL)

( * ) Notice: Subject to any disclaimer, the term of this patent is extended or adjusted under 35 U.S.C. 154(b) by 0 days.

(21) Appl. No.: 19/073,498

(22) Filed: Mar. 7, 2025

Related U.S. Application Data

(60) Provisional application No. 63/767,809, filed on Mar. 6, 2025.

(51) Int. Cl.
*G01B 9/02097* (2022.01)
*G01B 9/02015* (2022.01)
*G01B 9/04* (2006.01)

(52) U.S. Cl.
CPC ....... *G01B 9/02097* (2013.01); *G01B 9/0203* (2013.01); *G01B 9/04* (2013.01); *G01B 2210/56* (2013.01); *G01B 2290/70* (2013.01)

(58) Field of Classification Search
CPC .... G01B 9/0203; G01B 9/02097; G01B 9/04; G01B 2210/56; G01B 2290/45; G01B 2290/70
See application file for complete search history.

(56) References Cited

U.S. PATENT DOCUMENTS

| 5,604,591 | A | * | 2/1997 | Kitagawa | G01J 9/02 356/491 |
|---|---|---|---|---|---|
| 8,830,573 | B2 | * | 9/2014 | Cui | G02B 21/0068 359/371 |
| 11,892,292 | B2 | | 2/2024 | Furman | |
| 2004/0156098 | A1 | | 8/2004 | Dubois et al. | |
| 2014/0078298 | A1 | * | 3/2014 | Kudenov | G02B 5/1833 359/325 |
| 2018/0348703 | A1 | * | 12/2018 | Furman | G03H 1/0443 |
| 2021/0102892 | A1 | | 4/2021 | Oron et al. | |

FOREIGN PATENT DOCUMENTS

| CN | 101762331 A | | 6/2010 | |
| GB | 1350440 A | * | 4/1974 | ........ G01B 11/303 |
| JP | H05188327 | * | 7/1993 | |
| WO | 2020089900 A1 | | 5/2020 | |
| WO | 2024105664 A1 | | 5/2024 | |

OTHER PUBLICATIONS

Anishchik, et al. "Optical microscope with nanometer longitudinal resolution based on a Linnik interferometer." arXiv preprint arXiv:2406. 08403 (2024), 17 pages.

(Continued)

Primary Examiner — Michael A Lyons
(74) Attorney, Agent, or Firm — Smith Baluch LLP

(57) ABSTRACT

A self-referencing interferometric microscope uses near-common-path, common component beam separators to produce two beams that illuminate the sample at different angles. Two return beams collected from the sample interfere at the image plane to produce an interferometric image of the sample comprising fringes across the image. The image can be processed to determine the topography of the sample.

16 Claims, 12 Drawing Sheets

(56) References Cited

OTHER PUBLICATIONS

Guo, et al. "Low-coherence shearing interferometry with constant off-axis angle." Frontiers in Physics 8 (2021): 611679, 7 pages.
Kuznetsova et al., "Imaging interferometric microscopy-approaching the linear systems limits of optical resolution," Opt. Express 15, 6651-6663 (2007).
Lin, et al. "Phase-Shifting Shearing Interference Microscope with Savart Shear Prism and Rotatable Analyzer." Proceedings. vol. 2. No. 8. MDPI, 2018, 5 pages.

* cited by examiner

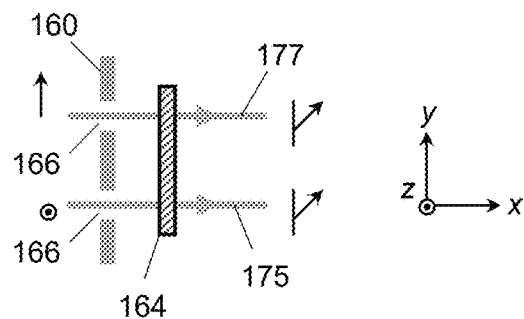
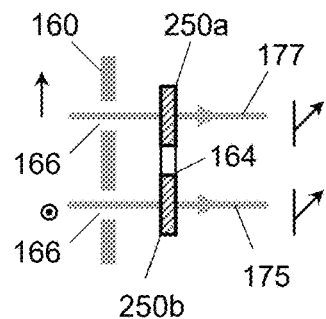
FIG. 5A
FIG. 5B
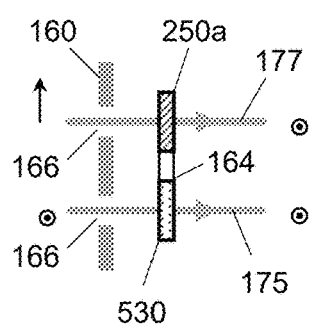
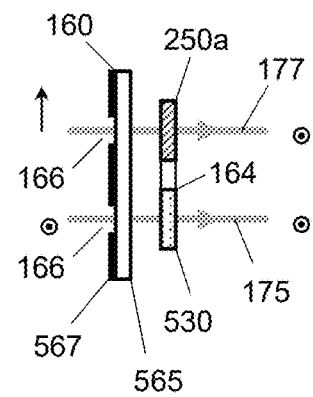
FIG. 5C
FIG. 5D
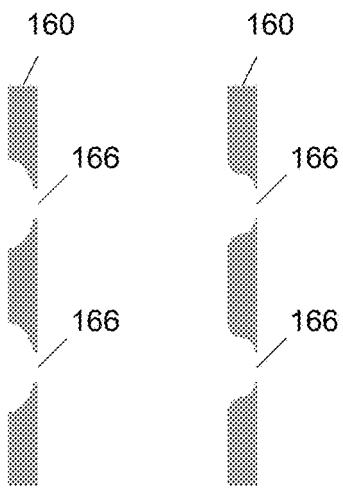
FIG. 5E

SELF-REFERENCING INTERFEROMETRIC MICROSCOPE

CROSS-REFERENCE TO RELATED APPLICATION(S)

The present application claims the priority benefit, under 35 U.S.C. 119(e), of U.S. Application No. 63/767,809, filed Mar. 6, 2025, which is incorporated herein by reference in its entirety for all purposes.

BACKGROUND

Holographic imaging, which records amplitude and phase information of light arriving from an object, may be used in microscopy to reconstruct the three-dimensional profile of the object, i.e., the relative height of each point in the image. In a holographic microscope, typically a beam of light which has phase information imparted to it by features of a sample under inspection is interfered with a reference beam having a uniform phase front. Obtaining three-dimensional information about microscopic features can be useful for semiconductor microfabrication technology (e.g., metrology and inspection of wafers having topography) and inspecting samples having microscopic structure.

SUMMARY

The present technology relates to interferometric microscopy and to methods and systems of three-dimensional measurements using self-referencing interferometric microscopy. In this approach, two optical beams are incident on a same region of a sample from two different incidence angles having different magnitudes. The two optical beams are produced from the same input beam and are copies of each other in terms of their wavefronts. The two beams are returned from (e.g., reflected and/or scattered from) or transmitted through the same region of the sample under inspection and subsequently interfered at an image plane where interferometric images are recorded. At the sample, the overlap of the two beams on the same region or area of the sample is from 70% to 100%, from 80% to 100%, from 90% to 100%, from 95% to 100%, or even from 97% to 100%. Phase information is imparted to both beams upon reflection from or transmission through the sample. However, the amount of phase information imparted to each beam is different due to the different magnitudes of the incidence angles of the two beams on the sample. The interferometric image of the sample is produced at the image plane by recombining the two beams. This approach differs from a holographic approach in which a beam affected by the sample is combined with a reference beam having an undisturbed wavefront. In the self-referencing interferometric microscopes disclosed below, a first beam with a wavefront affected by the sample is self-referenced to a second beam also affected by the same sample surface, though to a different degree in terms of phase. This type of microscopy is referred to herein as "self-referencing interferometric microscopy" and may also be referred to as "phase-delay interferometric microscopy" or "phase-differentiated interferometric microscopy." Self-referencing interferometric microscopy can be considered as a particular type of microscopy within the broader field of interferometric microscopy.

In some implementations, a self-referencing interferometric microscope can employ two beam separators, one before the sample to be imaged and one after the sample. The beam separators can be common-component beam separators which have near-common optical paths throughout each beam separator. A first beam separator can produce two optical beams that illuminate the sample from two angles having different magnitudes ($|\theta_1| \neq |\theta_2|$) and interfere at the image plane to provide an interferometric image of the sample at the image plane. The inventors have recognized and appreciated that because of the near-common paths and common optical components employed in the beam separators, the self-referencing interferometric microscope is significantly less sensitive to perturbations from the environment. Such perturbations would otherwise degrade image quality if other types of beam separators were used. Additionally, the near-common path, common component beam separators used for the interferometric microscope can be more compact than other types of beam separators used to separate or shear an optical beam. In some implementations, a single beam separator can be used for the interferometric microscope.

Some implementations relate to self-referencing interferometric microscopes. Such microscopes can comprise: a first polarizing beamsplitter (PBS) to separate an illumination beam of the self-referencing interferometric microscope into a first optical beam in a first polarization state and a second optical beam in a second polarization state orthogonal to the first polarization state; and a first pair of mirrors, in optical communication with the first PBS, to: direct the first optical beam from the first PBS around a first multi-leg optical path and back to the first PBS in a first direction, and direct the second optical beam from the first PBS around a second multi-leg optical path and back to the first PBS in a second direction opposite to the first direction. The microscope can further comprise: a first positioning stage to move one mirror of the first pair of mirrors so as to vary a lateral offset $S_1$ between the first optical beam and the second optical beam; a first optical window arranged to be rotated about an axis perpendicular to the direction of the lateral offset and perpendicular to at least the first optical beam when the first optical beam passes through the first optical window such that the first optical beam and the second optical beam are shifted in a direction of the lateral offset with rotation of the first optical window when the first optical beam passes through the first optical window; and an objective lens, in optical communication with the first PBS and the first optical window, to: focus the first optical beam and the second optical beam on a sample, the sample reflecting and/or scattering the first optical beam as a first return beam and reflecting and/or scattering the second optical beam as a second return beam, and collect the first return beam and the second return beam. The self-referencing microscope can further comprise: a second PBS, in optical communication with the objective lens, to direct the first return beam in a first direction away from the second PBS and to direct the second return beam in a second direction away from the second PBS; and a second pair of mirrors, in optical communication with the second PBS, to: direct the first return beam from second PBS around a third multi-leg optical path and back to the second PBS in a third direction, wherein the first return beam subsequently propagates away from the second PBS as a first output beam, and direct the second return beam from the second PBS around a fourth multi-leg optical path and back to the second PBS in a fourth direction opposite to the third direction, wherein the second return beam subsequently propagates away from the second PBS as a second output beam. The microscope can further comprise: at least one polarization control optic, in optical communication with the second PBS, to place the first output beam and the second output beam in a same polarization state; and an imaging device, in optical communication with the at least one polarization control optic, to detect an interferometric image formed at the imaging device by optical interference of the first output beam and the second output beam.

Some implementations relate to optical assemblies for self-referencing interferometric microscopes. Such optical assemblies can comprise: a first beam separator to separate an illumination beam of the self-referencing interferometric microscope into a first optical beam having a first central axis and a second optical beam having a second central axis, wherein: the first optical beam travels along a first optical path forming a first loop within the first beam separator, the second optical beam travels along a second optical path forming a second loop within the first beam separator, the first optical beam and the second optical beam interact only with common optical components in the first beam separator, and the first central axis is laterally offset by a first separation distance $S_1$ from the second central axis when the first optical beam and the second optical beam exit the first beam separator. The optical assemblies can further comprise: an objective lens, wherein the objective lens is arranged to: receive the first optical beam and the second optical beam that have exited the first beam separator, focus the first optical beam onto a sample at a first angle, and focus the second optical beam onto the sample at a second angle that is different from the first angle.

Some implementations relate to optical assemblies for a self-referencing interferometric microscope. Such optical assemblies can comprise: a sample support to hold a sample for optical inspection by the self-referencing interferometric microscope; and an objective lens arranged to: receive a first return beam traveling at a first angle from a portion of the sample when the sample is held by the sample support and illuminated, and receive a second return beam traveling at a second angle from the sample that is different in magnitude from the first angle, the second return beam received from a same portion of the sample. The optical assemblies can further comprise: a beam separator in optical communication with the objective lens and configured to receive the first return beam and the second return beam, wherein: the first return beam travels along a first optical path forming a first loop within the beam separator, the second return beam travels along a second optical path forming a second loop within the beam separator, the first return beam and the second return beam interact only with common optical components in the beam separator, and the first return beam exits the beam separator as a first output beam and the second return beam exits the beam separator as a second output beam. The optical assemblies can further comprise: an aperture plate in optical communication with the beam separator and arranged in the optical assembly to receive the first return beam and the second return beam from the objective lens or the first output beam and the second output beam from the beam separator, the aperture plate comprising at least one opening through which the first return beam and the second return beam or the first output beam and the second output beam pass; an imaging lens in optical communication with the beam separator and arranged in the optical assembly to form an interferometric image of the portion of the sample at an image plane from the first output beam and the second output beam; and an imaging device arranged in the optical assembly to detect the interferometric image.

Some implementations relate to methods of producing an interferometric image of a sample with an optical assembly of a self-referencing interferometric microscope. Such methods can include acts of illuminating the sample; receiving, through an objective lens, a first return beam at a first angle from a portion of the sample; receiving, through the objective lens, a second return beam at a second angle from a same portion of the sample, wherein the second angle is different than the first angle; and receiving the first return beam and the second return beam with a beam separator in which: the first return beam travels along a first optical path forming a first loop within the beam separator, the second return beam travels along a second optical path forming a second loop within the beam separator, the first return beam and the second return beam interact only with common optical components in the beam separator, and the first return beam exits the beam separator as a first output beam and the second return beam exits the beam separator as a second output beam. The methods can further comprise acts of passing the first return beam and the second return beam or the first output beam and the second output beam through two openings in an aperture plate; forming, with an imaging lens, an interferometric image of the portion of the sample at an image plane from the first output beam and the second output beam; and capturing the interferometric image with an imaging device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5A depicts an example of an aperture plate and polarization control optic for operating on return beams received from the sample.

FIG. 5B depicts an aperture plate and a different arrangement of optical components for a polarization control optic to operate on return beams received from the sample.

FIG. 5C depicts an aperture plate and a different optical arrangement having at least one polarizing optical component for a polarization control optic to operate on at least one return beam received from the sample.

FIG. 5D depicts another implementation of an aperture plate.

FIG. 5E depicts two different edge profiles that can be used for apodizing aperture plates.

DETAILED DESCRIPTION

1. Overview of Self-Referencing Interferometric Microscopy

Figure 1A:
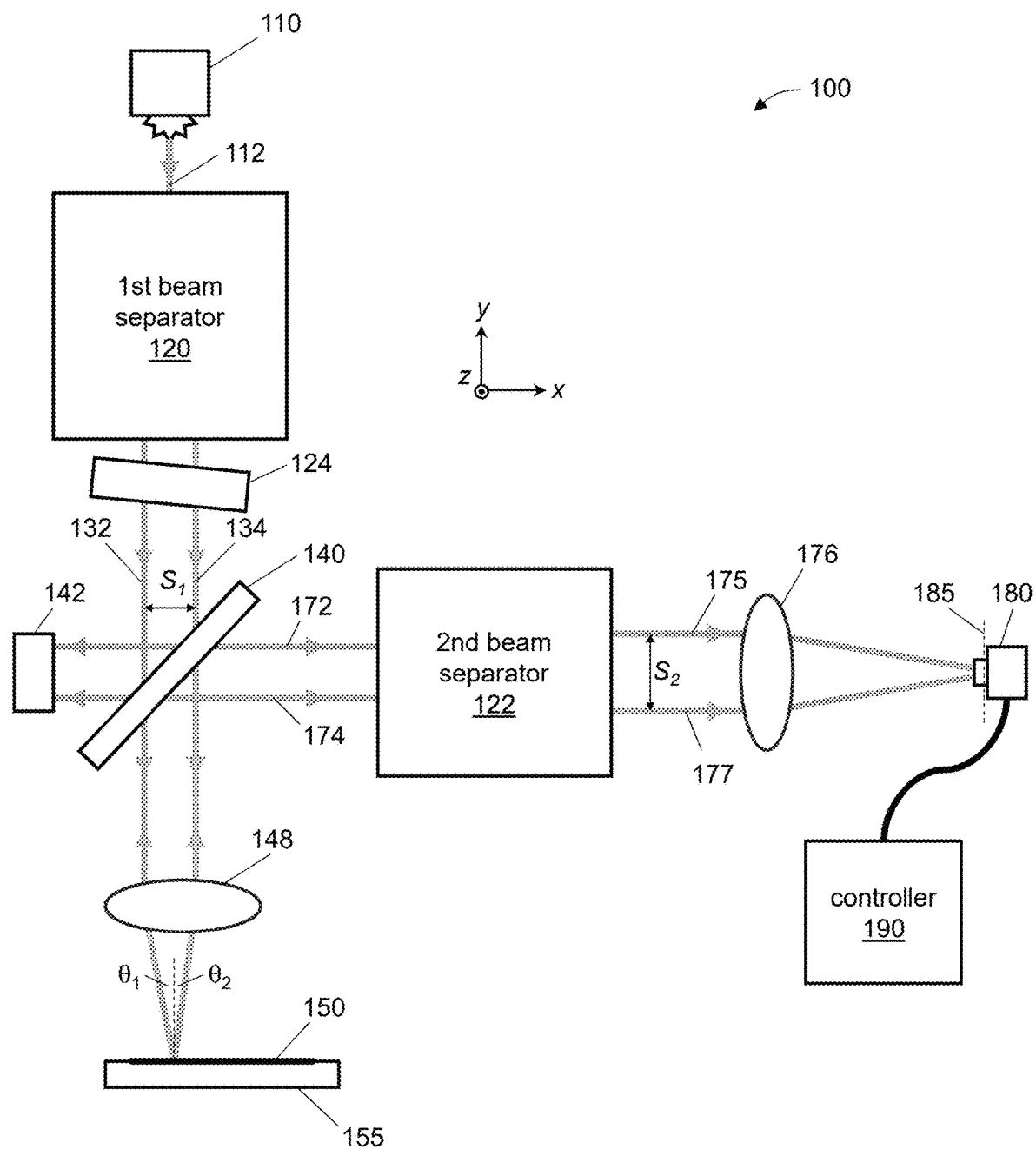
FIG. 1A depicts an example of a near-common path, common-component self-referencing interferometric microscope.

The inventors have recognized and appreciated that in order to achieve fast lateral scanning of a large sample using interferometric microscopy to obtain topographical information, it is desirable to extract the phase information indicative of topography from each interferometric image acquired of the sample. As the sample is scanned, many interferometric images are taken of portions of the large sample to cover a desired area of the sample, which could be an entire semiconductor wafer surface, for example. Extraction of phase information from each interferometric image may be done, in part, by interfering two coherent images of the sample, where the two coherent images are generated for each interferometric image acquisition as described in further detail below. The two coherent images are interfered at an angle to produce uniformly-spaced fringes across the resulting interferometric image. The spatial frequency of fringes in the interferometric image can be controlled by the angle between the two interfering beams comprising the two coherent images. The arrangement of the self-referencing interferometric microscope is such that when the sample has, for example, a raised or depressed surface above or below a flat base, the interference fringes shift compared to the flat base indicating the presence of the raised or depressed surface. The amount of fringe shift can be used to determine the height (or depth) of the raised (depressed) surface from only one interferometric image of the surface.

As used herein, an "interferometric image" is an optical image formed by the optical interference of two coherent images, where the two coherent images are obtained from the same region of a sample. The interferometric image has optical interference fringes across the image. A "coherent image" is an optical image of a region of the sample where the image has a degree of optical coherence (temporal and/or spatial) across the image such that the coherent image can be optically interfered with another coherent image obtained from the same region of the sample to produce an interferometric image having optical interference fringes across the interferometric image.

The inventors have further recognized and appreciated that approaches to self-referencing interferometric microscopy using Mach-Zehnder type or Michelson type optical arrangements for beam separation or shearing are susceptible to environmental perturbations that degrade image quality and image analysis. In such systems, two optical beams used to illuminate the sample travel different optical paths that are spatially separated by significant distances (e.g., more than 5 mm or even more than 1 cm) over at least some portions of the optical paths. Also, different, spatially-separated, optical components are used in the two optical paths. Because the two optical beams travel two different paths and are operated on and/or interact with different, spatially-separated, optical components, such non-common-path, non-common-component systems are significantly more susceptible to unwanted and unstable relative phase shifts between the two optical beams. The unwanted phase shifts can arise from environmental vibrations, thermal variations, and air disturbances, causing errors in 3D images obtained with interferometric microscopes employing Mach-Zehnder type or Michelson type optical arrangements for beam separation.

FIG. 1A depicts, in a simplified illustration, an example of a near-common-path, common-component, self-referencing interferometric microscope 100 that can obtain 3D information about a sample from a single interferometric image. The main components of the self-referencing interferometric microscope 100 include an illumination source 110 which produces an illumination beam 112, a first beam separator 120, a second beam separator 122, an objective lens 148, an imaging lens 176, an imaging device 180, and a controller 190. The interferometric microscope 100 can further comprise an optical window 124, a beamsplitter 140, and a beam dump 142. In some cases, the interferometric microscope 100 can further comprise photodetectors at the location of the beam dump 142 to block and/or detect portions of the first optical beam 132 and the second optical beam 134 that are split off by the beamsplitter 140 and directed toward the beam dump 142.

In some implementations, the first beam separator 120 and the second beam separator 122 are common-component beam separators. A "common-component beam separator" comprises an arrangement of optical components to create two spatially separated optical beams from a single incident optical beam received by the beam separator, or to change a separation distance between two incident optical beams received by the beam separator. In the common-component beam separator, each optical beam of the two optical beams interacts with an optical component with which the other optical beam interacts. Stated alternatively, wherever one of the two optical beams interacts with an optical component in the beam separator, the other optical beam of the two optical beams also interacts with that optical component a same number of times. For example, if the first optical beam of the two optical beams reflects from a mirror once in the beam separator, the second optical beam also reflects from the same mirror once.

In some implementations, the first beam separator 120 and the second beam separator 122 are near-common-path beam separators. A "near-common-path beam separator" comprises an arrangement of optical components to create two spatially separated optical beams from a single incident optical beam received by the beam separator, or to change a separation distance between two incident optical beams received by the beam separator. Each optical beam of the two optical beams passing through the near-common-path beam separator propagates within a small distance (e.g., distance $S_1$ for the first beam separator 120, distance $S_2$ for the second beam separator 122) of the other optical beam within the beam separator. The distances $S_1$, $S_2$ can be between approximately or exactly 10 microns and approximately or exactly 1 mm in some cases, between approximately or exactly 10 microns and approximately or exactly 2 mm in some cases, between approximately or exactly 10 microns and approximately or exactly 5 mm in some cases, between approximately or exactly 10 microns and approximately or exactly 10 mm in some cases, and yet between approximately or exactly 10 micron and approximately or exactly 20 mm in some cases. The distances $S_1$, $S_2$ (also referred to as a "lateral offset") for each beam separator is measured between a central optical axis of each optical beam. The distances $S_1$, $S_2$ may or may not be equal to each other. In some cases, the two optical beams can partially overlap when traversing the beam separator (e.g., if the beam waist w of both optical beams is greater than the separation distance $S_1$, $S_2$ and the beams are axially symmetric). In some cases, the separation distance $S_1$, $S_2$ (referred to more generally as S for a beam separator) can be expressed in terms of beam waist of the beams passing through the separator (e.g., S is no larger than approximately or exactly 2w in some cases, S is no larger than approximately or exactly 4w in some cases, S is no larger than approximately or exactly 8w in some cases).

In some implementations, the first beam separator 120 and the second beam separator 122 are near-common-path, common-component beam separators having both features of the common-component beam separator and near-common-path beam separators described above. Radiation input to the first beam separator 120 can be polarized or unpolarized. Radiation output from the first beam separator 120 can be polarized or unpolarized. Radiation input to the second beam separator 122 can be polarized or unpolarized. Radiation output from the second beam separator 122 can be polarized or unpolarized. Preferably, radiation output from the first beam separator 120 is polarized. If radiation output from the first beam separator 120 is not polarized, then one or more polarization control optics can be used to prepare the return beams 172, 174 in desired polarization states before the second beam separator 122. Preferably, radiation input to and output from the second beam separator 122 is polarized. Further aspects of the beam separators are described below in connection with FIG. 2 through FIG. 3E and FIG. 7A through FIG. 7F.

As a brief overview of operation of the interferometric microscope 100, the first beam separator 120 receives an illumination beam 112 from the illumination source 110 and produces a first optical beam 132 and second optical beam 134 that are spatially separated, at least in part, from each other. The first optical beam 132 and the second optical beam 134 are used to illuminate a sample 150, from two incidence angles $\theta_1$, $\theta_2$ having different magnitudes. The sample 150 can be held on a sample support 155. The first optical beam 132 and the second optical beam 134 can pass through a beamsplitter 140 (in a reflected light microscopy instrument) and be condensed onto the sample 150 by the objective lens 148. An optical window 124 can be located in the interferometric microscope 100 (inside or outside the first beam separator 120) such that the first optical beam 132 and the second optical beam 134 pass through the optical window 124. Rotation of the optical window 124 (about an axis parallel to the z axis in FIG. 1A) can shift the first optical beam 132 and the second optical beam 134 with respect to the central axis of the objective lens 148 (e.g., in the ±x direction indicated in the drawing) to provide adjustment of the two incidence angles $\theta_1$, $\theta_2$.

According to some implementations, the optical window 124 can be located at a position in the interferometric microscope that is optically conjugated by one or more lenses to the back focal plane of the objective lens 148. In some implementations, the optical window 124 can be located at a position in the interferometric microscope where the two optical beams 132, 134 or the two return beams 172, 174 are exactly or essentially parallel. The optical window can be rotated about an axis that is perpendicular to the direction of the lateral offset $S_1$ between the two optical beams 132, 134 passing through the optical window 124. The axis of rotation for the optical window 124 can also be perpendicular to at least the optical beam path of the first optical beam 132 passing through the optical window 124.

In some implementations, the optical window 124 may not be used. For example, the objective lens 148 may be moved laterally so that the first optical beam 132 and the second optical beam 134 lie different distances from the central axis of the objective lens 148. In some cases, no optical window is used for moving the two optical beams 132, 134 laterally and the objective lens 148 is not moveable laterally. Instead, the first optical beam 132 and the second optical beam 134 lie different distances from the central axis of the objective lens 148. The first beam separator 120 and/or a relay optic 143 can be used to change a distance $S_1$ between the two optical beams 132, 134, thereby changing the incidence angles $\theta_1$, $\theta_2$.

According to some implementations, the optical window 124 is not used and the location of the objective lens 148 with respect to the first beam separator 220 is fixed. In such implementations, the optical paths of the illumination beam 112, the first optical beam 132, the second optical beam 134, the return beams 172, 174, and the output beams 175, 177 all remain essentially fixed. For example, optical components in the interferometric microscope 100 that determine these optical paths are aligned during manufacture of the microscope and fixed to provide a predetermined range of height detection for the microscope. Adjustments for the optical components in the microscope may be included to maintain alignment of the optical components, but not for changing the range of height detection.

Light scattered and reflected back from the sample 150 for each optical beam 132, 134 can be collected by the objective lens 148, forming two return beams 172, 174 that partially reflect from the beamsplitter 140 and are received by the second beam separator 122. The second beam separator can provide further adjustment of separation between the return beams 172, 174, producing output beams 175, 177 which subsequently pass through the imaging lens 176 to form the interferometric image at the image plane 185.

The amount of separation of the output beams 175, 177 before the imaging lens 176 determines, in part, the angle at which the two output beams and their coherent images interfere at the system's final image plane 185, where the interferometric image is formed. The interferometric image comprises an image of a portion of the sample (within the field of view of the microscope) modulated by a fringe pattern produced by the two output beams 175, 177 at the image plane 185. The interference fringes in the image may be referred to as "image fringes." An imaging device 180 can be used to capture the interferometric image formed at the image plane 185 for further analysis. The imaging device can comprise a CCD or CMOS imaging array and can be implemented as a camera. The captured image can be processed by the controller 190 or sent to another image processing device by the controller 190 for analysis (e.g., to determine 3D topography from the captured image).

The self-referencing interferometric microscope 100 can comprise at least one controller 190. Only one controller is shown in FIG. 1A, but the microscope can include two or more controllers. At least one controller 190 can be configured to record the captured interferometric images in memory. The memory can be included with the controller 190 (e.g., part of the controller package) or can be remote from the controller (e.g., accessed over a communication link). The controller(s) 190 can comprise at least one processor. A processor can comprise a microcontroller, a microprocessor, a programmable logic unit (PLU), a digital signal processor (DSP), an application specific integrated circuit (ASIC), a field-programmable gate array (FPGA), custom digital circuitry, or some combination thereof. Each controller 190 can be a packaged, stand-alone device included with or integrated in the self-referencing interferometric microscope 100 and can communicatively couple to the one or more components of the self-referencing interferometric microscope 100 with a wired or wireless link. In some implementations, system control can be implemented, at least in part, with a single, packaged, stand-alone device (e.g., circuitry comprising a microcontroller or microprocessor and a touchscreen). In some implementations, system control can be implemented, at least in part, with a personal computer or laptop computer via a communication link to the self-referencing interferometric microscope 100. Alternatively, system control can be implemented with a distributed controller, with at least some components located at different and separated physical locations from each other but communicating over a network. In some implementations, a first controller can be used to control the illumination source 110 and a second controller, which may or may not be communicatively coupled to the first controller, can be used to control the imaging device 180.

In FIG. 1A, the controller 190 is depicted as having a wired communication link to the imaging device 180 (e.g., to control image acquisition and receive image data). However, the communication link can be wireless in some implementations. The controller 190 can also be communicatively coupled (through wired and/or wireless links) to other components of the self-referencing interferometric microscope 100. For example, the controller 190 can be communicatively coupled to one or more of the following components: illumination source 110, an actuated rotation mount that rotates the optical window 124, one or more actuators in the first beam separator 120 (for adjusting beam separation and optical path length), sample support 155 (e.g., for scanning the sample 150), one or more actuators in the second beam separator 122 (for adjusting beam separation and optical path length). The controller 190 can also be communicatively coupled to other components in the interferometric microscope 100, not shown in FIG. 1A but described below in connection with FIG. 1B and FIG. 1C and the following drawings describing different implementations of the interferometric microscope. Such components can include, but are not limited to, an actuator that automates adjustment of the pupil stop 146, the positioning stage 147 for moving the folding mirror 141, one or more actuators that adjusts the aperture plate 160, one or more actuators for controlling the polarization control optic 164, etc.

1.1 Optional Optical Components

Figure 1B:
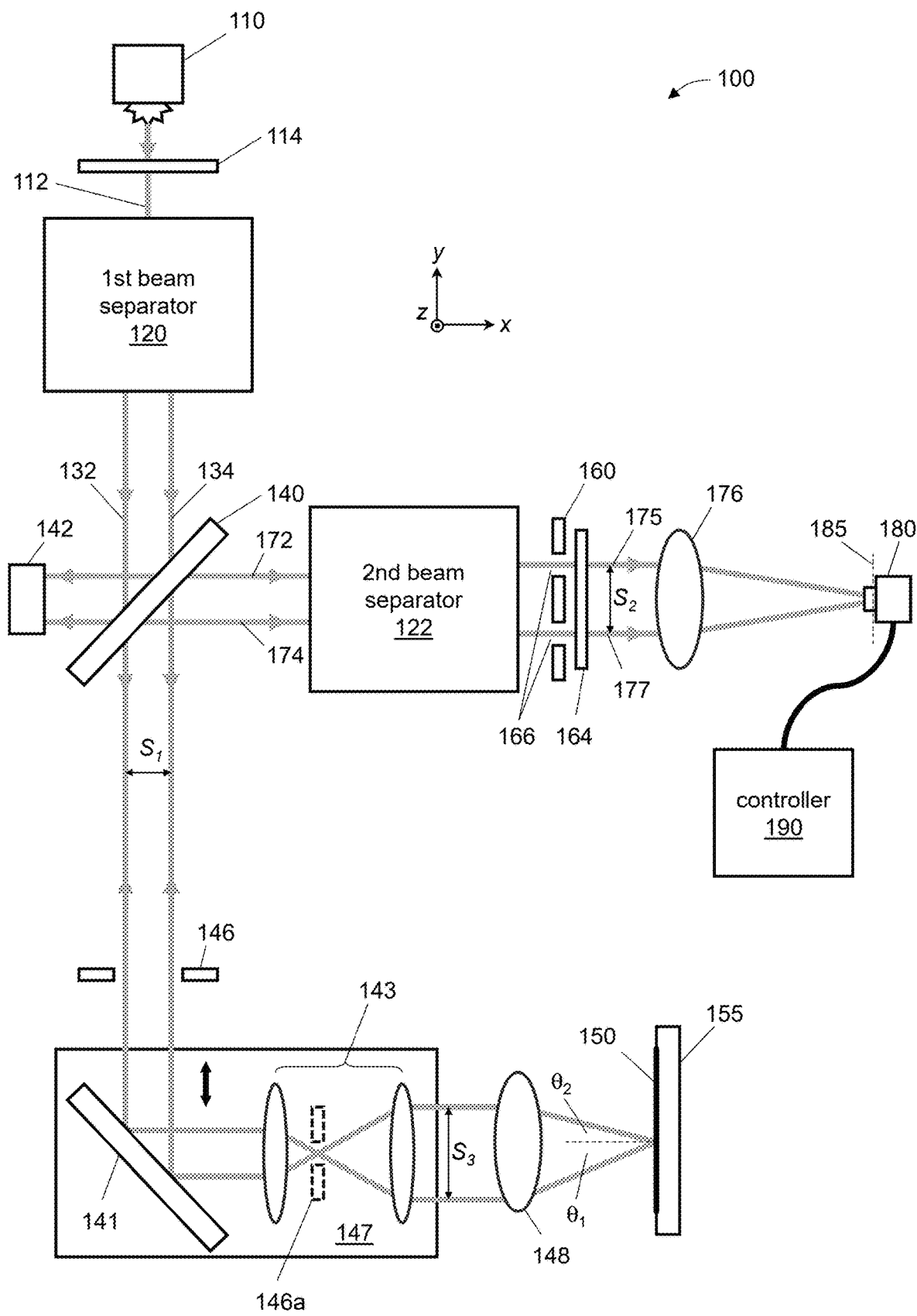
FIG. 1B depicts an example of a near-common path, common-component self-referencing interferometric microscope.

FIG. 1B depicts another example of a near-common-path, common-component, self-referencing interferometric microscope 100. The interferometric microscope 100 can be implemented in different ways with additional optical components. For one example implementation, a polarized illumination beam 112 can be used. If the illumination source 110 does not produce polarized radiation, a polarizing optical element 114 can be placed in the interferometric microscope 100 to polarize the illumination beam 112 (e.g., located in the beam path of the illumination beam 112) and/or polarize the first optical beam 132 and second optical beam 134 produced by the first beam separator 120 (e.g., located within or after the first beam separator 120).

An optional optical component that can be included in the interferometric microscope 100 is a folding mirror 141 located between the beamsplitter 140 and the objective lens 148. The folding mirror 141 can be used instead of the optical window 124 to shift the positions of the first optical beam 132 and second optical beam 134 with respect to the central axis of the objective lens 148 for adjustment of the incidence angles $\theta_1$, $\theta_2$. The folding mirror 141 can be mounted on a positioning stage 147 to move the folding mirror 141 and shift the two optical beams 132, 134 in the y direction indicated in the drawing, as an example.

Another option to shift the two optical beams 132, 134 with respect to the objective lens 148 without using an optical window 124 is to introduce an optical wedge into the beam paths of the two optical beams 132, 134 at a location that is optically conjugated to the location of the sample 150. One such location could be between the lenses of the relay optic 143 (e.g., at the location of the dashed rectangle 146a depicted in FIG. 1B). In some implementations, the optical wedge can be placed into beam paths where the two optical beams 132, 134 or the two return beams 172, 174 are not parallel.

An optional optical component that can be included in the interferometric microscope 100 is a relay optic 143 comprising one or more lenses. In some cases, a relay optic 143 comprising a single lens can implemented with a graded refractive index lens. At least two lenses of different focal lengths can be used for the relay optic 143 to increase or decrease the separation distance $S_1$ between the first optical beam 132 and second optical beam 134. The relay optic 143 can be located between the first beam separator 120 and the objective lens 148. If a folding mirror 141 is present, the relay optic 143 can be mounted on the positioning stage 147 with the folding mirror 141. If the optical window 124 is used, the relay optic 143 can be mounted on a fixed mount or on fixed mounts in the interferometric microscope 100. However, in some cases the relay optic 143 can be shifted with the first optical beam 132 and second optical beam 134 such that the first optical beam 132 and second optical beam 134 pass through the relay optic 143 symmetrically with respect to the central optical axis of the relay optic 143.

An optional optical component that can be included in the interferometric microscope 100 is a pupil stop 146. The pupil stop can be located between the first beam separator 120 and the objective lens 148. The pupil stop 146 can be used to reduce stray light that may contribute to background optical noise in the interferometric image at the image plane 185. In some implementations, the pupil stop 146 can function as a field stop located at a position between the illumination source 110 and the objective lens 148 that is optically conjugated to the front focal plane of the objective lens 148 or location of the sample. One such conjugate position is between the lenses of the relay optic 143 (indicated by the dashed rectangle 146a), where the first optical beam 132 and second optical beam 134 cross between the two lenses for example.

An optional optical component that can be included in the interferometric microscope 100 is an aperture plate 160 to aperture the output beams 175, 177 prior to forming the interferometric image at the image plane 185. The aperture plate 160 can comprise two openings 166, which each may be adjustable in size and/or in relative position to each other (e.g., to independently aperture (restrict the size of) each of the output beams 175, 177 and/or reposition the openings 166 for changes in the beam separation distance $S_2$). In some implementations, the aperture plate 160 comprises a single opening 166 through which both optical beams pass. The self-referencing interferometric microscope 100 can also comprise a beam dump 142 to block unused portions of the first optical beam 132 and the second optical beam 134 that are split off by the beamsplitter 140. The two openings 166 in the aperture plate 160 can be of the same size or different sizes. In some implementations, there can be an aperture plate 160 with two or more different pairs of openings so that any pair of openings can be selected by repositioning (e.g., sliding and/or rotating) the aperture plate 160. The size of the openings 166 can control the ratio of specular to diffusive reflections from the sample 150 that go into forming the interferometric image at the image plane 185.

A further optical component that can be included in the interferometric microscope 100 is a polarization control optic 164. For interference of the two coherent images at the image plane 185, the output beams 175, 177 at the image plane 185 should comprise the same polarization state or approximately the same polarization state. In some implementations, the first optical beam 132 can have a polarization state (e.g., vertical linear polarization) that is approximately or exactly orthogonal to the polarization state (e.g., horizontal linear polarization) of the second optical beam 134. For linear polarizations, for example, the polarizations of the two optical beams 132, 134 can be exactly orthogonal to each other (90 degrees), within ±1 degree of being exactly orthogonal to each other, within ±2 degrees of being exactly orthogonal to each other, within ±5 degrees of being exactly orthogonal to each other, or even within ±10 degrees of being exactly orthogonal to each other. Such orthogonal polarization states of the first optical beam 132 and the second optical beam 134 can reduce or avoid undesired interference of these two optical beams at the sample 150. The polarization control optic 164 can be located between the beamsplitter 140 and the image plane 185. The polarization control optic 164 can place the return beams 172, 174 and/or the output beams 175, 177 in a same polarization state so that the coherent images formed at the image plane 185 from the output beams 175, 177 will coherently interfere.

Any one or combination of the foregoing optional optical components can be included in implementations of the near-common-path, common-component, self-referencing interferometric microscope described herein.

1.2 Transmission Interferometric Microscope

Figure 1C:
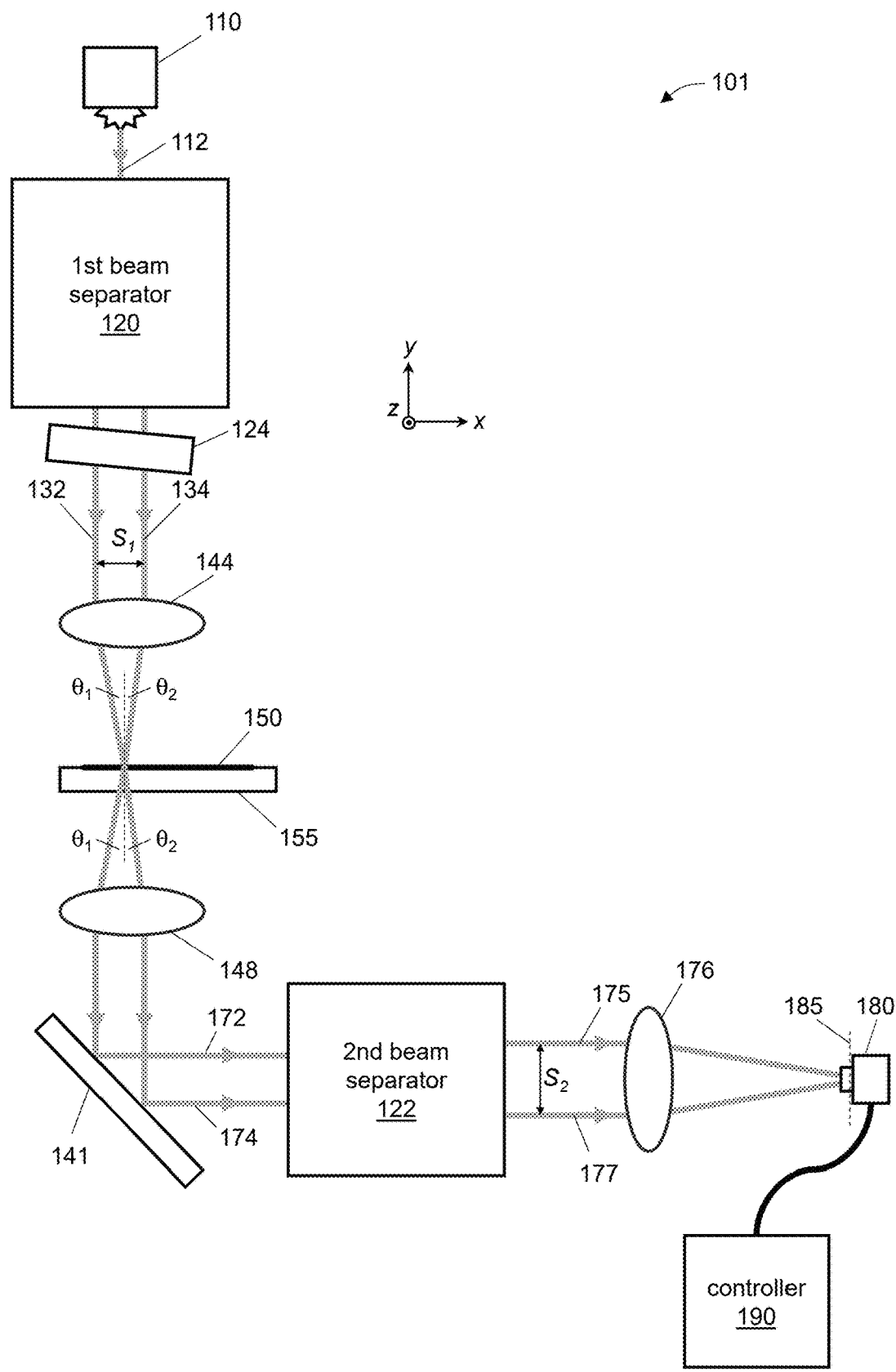
FIG. 1C depicts an example of a near-common path, common-component self-referencing transmission interferometric microscope.

The near-common-path, common-component, self-referencing interferometric microscope can be adapted for transmission optical microscopy. FIG. 1C depicts such an implementation of a near-common-path, common-component, self-referencing transmission interferometric microscope 101. In this arrangement, the first optical beam 132 and second optical beam 134 are focused on the sample 150 by a condensing lens 144 and transmitted through the sample 150. The objective lens 148 collects the return optical beams 172, 174 (transmitted through the sample in this case) which are received by the second beam separator 122. Any one or combination of the foregoing optional optical components described in connection with FIG. 1A and FIG. 1B can be included in implementations of the near-common-path, common-component, self-referencing transmission interferometric microscope 101 of FIG. 1C. The transmission interferometric microscope 101 can be useful for inspecting biological samples or other samples that are transmissive to the wavelength(s) of the illumination source 110. The transmission interferometric microscope 101 can detect 3D topography and/or changes in refractive index of material in the imaged area. For a transmission optical microscope, the beamsplitter 140 and beam dump 142 can be omitted.

Further details of the self-referencing interferometric microscope 100 are described below.

Figure 2:
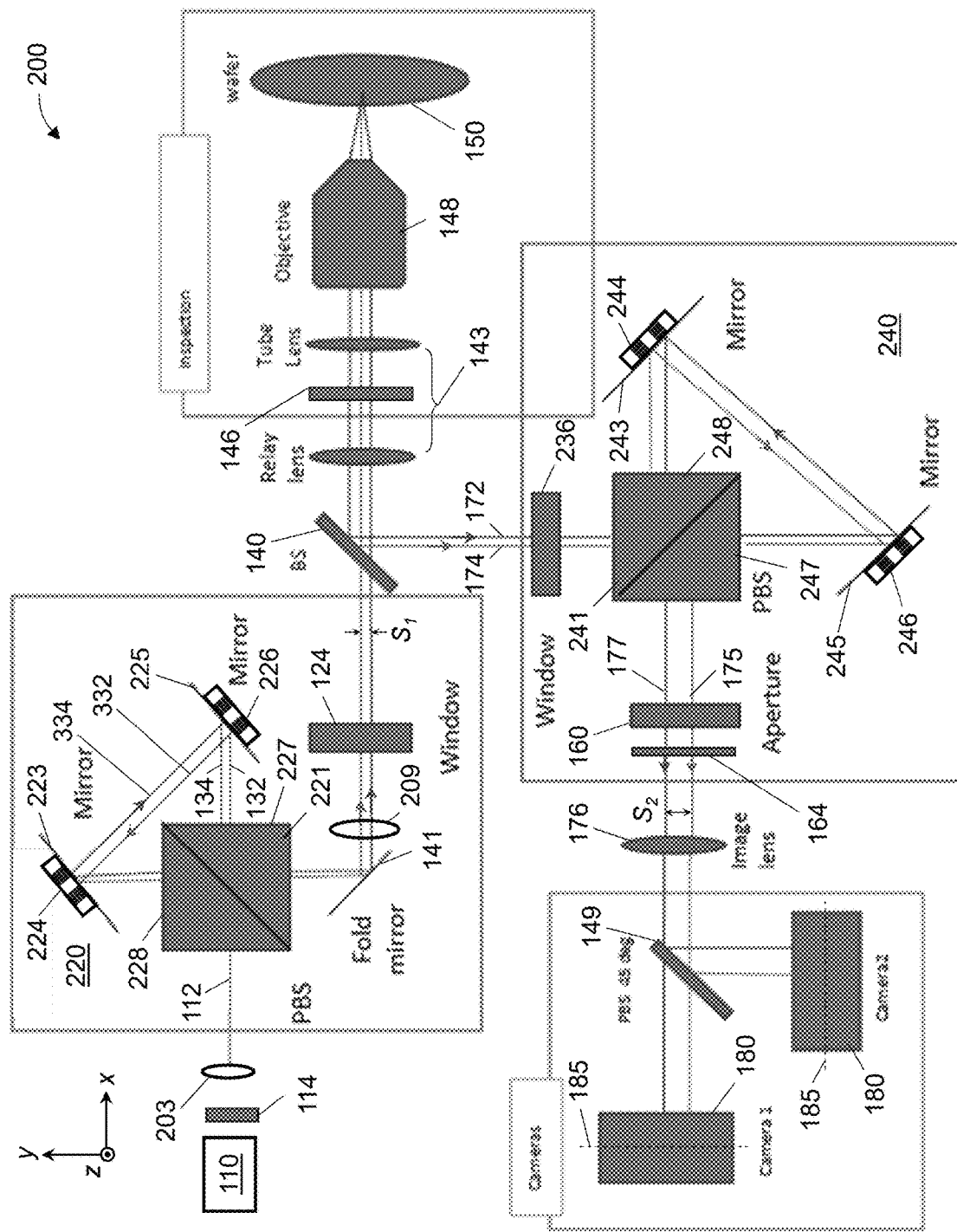
FIG. 2 depicts further details of an example implementation of a near-common-path, common-component, self-referencing interferometric microscope.

2. Example Self-Referencing Interferometric Microscope with Near-Common-Path, Common-Component Beam Separators FIG. 2 depicts further details of a self-referencing interferometric microscope 200 that comprises a first nearcommon-path, common-component beam separator 220, located before the sample 150, and a second near-common-path, common-component beam separator 240 located after the sample 150. The interferometric microscope 200 of FIG. 2 comprises many of the same components (labeled with the same reference numbers) as the self-referencing interferometric microscope implementations of FIG. 1A and FIG. 1B. These same components need not be described again.

Each beam separator 220, 240 has a relatively compact structure with only one beamsplitter in each separator and two mirrors mounted on positioning stages in each separator. For example, the first beam separator 220 comprises a first beamsplitter 221 with a first port 227 and a second port 228 and a first pair of mirrors 223, 225 that are mounted on positioning stages 224, 226 to move the mirrors. Each positioning stage 224, 226 can provide for motion of its mirror in at least one degree of freedom (e.g., along a linear axis lying in the x-y plane indicated in the drawing of FIG. 2. The positioning stages 224, 226 can be controlled by a user to adjust the separation distance $S_1$ between the first optical beam 132 and the second optical beam 134 output from the beam separator 220. In some cases, one or both of the mirrors 223, 225 can additionally be mounted in an adjustable mirror mount to adjust two angular orientations of the mirror (in two-degrees of freedom) with respect to the incoming beam (e.g., for steering the reflected beam in a desired direction). In some cases, the positioning stages 224, 226 can further include at least one rotation mount for rotating the mirror about an axis approximately or exactly parallel to the z axis indicated in the drawing and optionally or additionally at least one other axis orthogonal to the z axis. In other cases, at least one of the mirrors 223, 225 can be aligned during assembly of the beam separator and bonded or otherwise firmly affixed in an aligned orientation on its respective positioning stage 224, 226. Identical components can be used for each beam separator 220, 240 to reduce the number of different parts in the system, however different components can be used for the two beam separators 220, 240 in some implementation of the self-referencing interferometric microscope 200.

In some cases, the self-referencing interferometric microscope operates with unpolarized radiation from the illumination source 110. For example, the illumination source 110 can be one or more light-emitting diodes or an arc lamp. To improve overall optical throughput of the self-referencing interferometric microscope 200, polarized radiation can be used and the illumination source 110 can output polarized radiation. For example, the illumination source 110 can be a laser diode, fiber laser, or other laser. Alternatively, unpolarized output from an illumination source 110 can be polarized with a polarizing optical element 114. In some implementations, the illumination source 110 can be coupled to one or more optical fibers which produce the illumination beam 112. The system of FIG. 2 will be described below for an implementation in which the illumination beam 112 received by the first beam separator 220 is polarized.

In some cases, the illumination source 110 comprises a laser that outputs polarized radiation. In some implementations, the output from the laser can be coupled with at least one lens to one or more optical fibers. Light output from the optical fiber(s) can be used to form the illumination beam 112. In some cases, a lens 203 can be used to collect light from the illumination source 110 or optical fiber(s) to form the illumination beam 112. A polarizing optical element 114 can be located after the illumination source 110 (or after the optical fiber(s) if present) to prepare the illumination beam 112 that is input to the first beam separator 220 in a preferred polarization state. The polarizing optical element 114 can be a linear polarizer, which could be used with an illumination source 110 that outputs unpolarized radiation or partly polarized radiation to produce linearly polarized radiation. Alternatively, the polarizing optical element 114 can be a half-wave plate or a quarter-wave plate (e.g., to respectively rotate linear polarization or convert linearly polarized radiation from the illumination source 110). For example, linear vertical or horizontal polarization could be rotated 45 degrees or converted to circular polarization. In some implementations, the polarizing optical element 114 is not present (e.g., if polarization from the illumination source 110 is suitably oriented).

For polarized radiation, the first beamsplitter 221 can be a cube or plate polarizing beamsplitter (PBS) that separates the received illumination beam 112 into the first optical beam 132 polarized in a first polarization state (e.g., vertically-oriented linear polarization, z direction indicated in FIG. 2) and the second optical beam 134 polarized in a second, approximately or exactly orthogonal polarization state (e.g., horizontally-oriented linear polarization, y direction). One skilled in the art can readily appreciate that other approximately or exactly orthogonal polarization states can be used. For the implementation shown in FIG. 2, the first optical beam 132 travels in a first (rotational) direction (e.g., counterclockwise) around the first beam separator 220 and the second optical beam 134 travels in an exactly or approximately opposite second (rotational) direction (e.g., clockwise) around the first beam separator. The direction of travel of the two optical beams 132, 134 along each leg of multi-leg optical paths in the first beam separator 220, can be exactly opposite (180 degrees), within ±1 degree of being exactly opposite, within ±2 degrees of being exactly opposite, within ±5 degrees of being exactly opposite, or even within ±10 degrees of being exactly opposite. Because of the polarized radiation and use of a PBS, essentially all the optical power of the received illumination beam 112 can propagate through the first beam separator 220 and proceed toward the sample 150 without the first beam separator 220 reflecting or transmitting any significant amount of the optical power back toward the illumination source 110. The second beam separator 240 operates in a similar manner.

For the example self-referencing interferometric microscope 200 of FIG. 2, the output from the illumination source 110 can be polarized in a desired state, such that a polarizing optical element 114 is not used prior to the first beam separator 220. The inspection optical train (lensing before the sample 150) can comprise at least the first beam separator 220, the optical window 124, the objective lens 148, and a relay optic 143 (comprising a tube lens and relay lens in this example). In some implementations, the relay optic 143 is configured to relay the illumination source 110 (such as a point source) to the back focal plane of the objective lens 148. There can be magnification (increased or decreased) in the relayed image of the illumination source 110. The optical relaying of the illumination source 110 to the back focal plane can allow control of the lateral resolution at the image plane and field of view at the image plane by matching the etendue between the objective lens 148 and beam sizes in the first beam separator 220.

Two imaging devices 180 can be used in some implementations, as depicted in FIG. 2, to obtain two interferometric images of the sample 150. A beamsplitter 149 can be used after the second beam separator 240 to divide and direct each of the two output beams 175, 177 to the two imaging devices 180. In some implementations, the beamsplitter 149 is a polarizing beamsplitter. Using multiple imaging devices can speed up image acquisition and scanning of the sample. For example, the acquisition of images by the imaging devices 180 can be staggered in time to sequentially acquire and export interferometric images for image processing. In some cases, processing of images from the different imaging devices 180 can be done in parallel with a plurality of image processors (e.g., one image processor dedicated to each imaging device 180). In some implementations, the intensity levels detected by the imaging devices 180 can be made different (e.g., with optical attenuation or polarization rotation). Detection of interferometric images with different intensity can be used to increase the dynamic range of measurements. In some implementations, complementary interferometric images can be acquired to improve the accuracy of computed sample topography. A folding mirror 141 is shown in the optical setup of FIG. 2, though it is optional for the system and some implementations of the system may not use the folding mirror 141.

3. Beam Separators

Although the beam separators 220, 240 in FIG. 2 resemble Sagnac interferometers, the beam separators are typically not configured in these systems to provide interfering optical beams at their outputs, as would be the case for a Sagnac interferometer (e.g., in order to sense rotation of the Sagnac interferometer). In some cases, optical interference between the two optical beams 132, 134 output from at least the first beam separator 220 (and in some cases at the output of the second beam separator 240) is not desired for the interferometric microscopes 100, 101 described herein. For example, optical interference between the two optical beams 132, 134 is not desired at the sample 150 because information about the sample would be lost where the optical beams interfere destructively at the sample surface. Instead, the arrangement of optical components in each beam separator is configured to spatially separate and adjust the lateral distance between the counterpropagating beams (132, 134 and 172, 174) in each beam separator while also maintaining no optical path difference between the two counterpropagating beams, as described in connection with FIG. 3B. According to some implementations, the beam separators 220, 240 are stationary (e.g., not rotating) and provide adjustment of beam separation distance without adding optical path length to the two counterpropagating beams. Further, by placing the beams in approximately or exactly orthogonal polarization states, the beams cannot interfere with each other until the beams are returned to the same polarization state, which can be done after the second beam separator 240. Interference of the two beams would be undesirable when illuminating the sample 150. In a Sagnac interferometer, the two optical beams would be spatially overlapped as much as possible when exiting the interferometer and the two optical beams would have the same polarization to improve interference between the two beams. Further, in a Sagnac interferometer it may be desirable to move the entire Sagnac assembly (e.g., rotate the entire Sagnac) in a way to introduce a phase shift between the two optical beams rather than move only one or two components of the Sagnac. Operating a Sagnac interferometer that is designed to sense rotation of the interferometer in the manner described above for the beam separators 220, 240 would be contrary to the purposes of the Sagnac interferometer. With orthogonal polarizations, the output beams from the Sagnac would not interfere and hence, the name "Sagnac interferometer" would no longer apply. In some cases, the beam separator 220, 240 can be referred to as a "Sagnac-type optical assembly" or a "Sagnac-type beam separator" or a "Sagnac-type beam shearer."

Figure 3A:
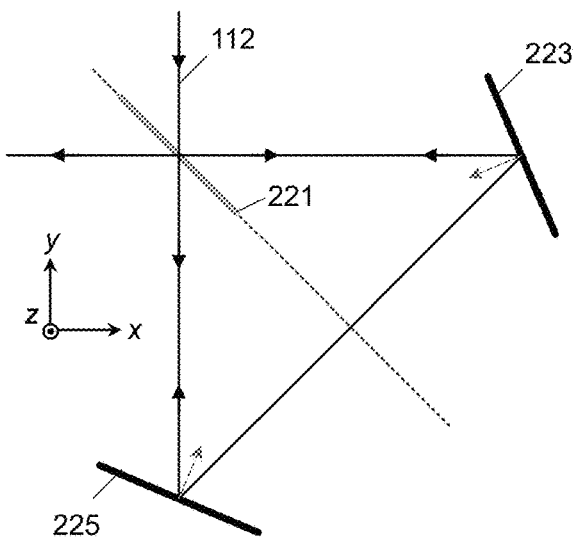
FIG. 3A depicts a symmetrical arrangement of optical components that can be adapted for use in a near-common-path, common-component beam separator for the self-referencing interferometric microscopes of FIG. 1A through FIG. 2.
Figure 3B:
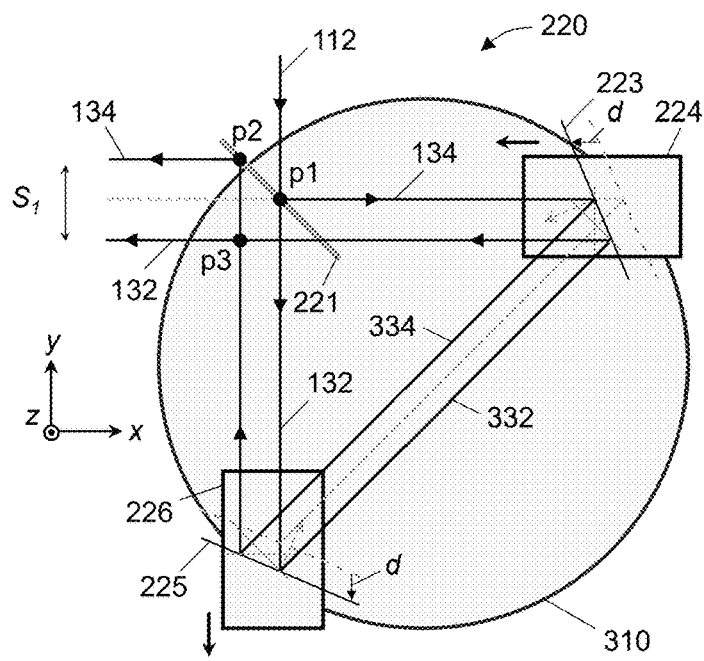
FIG. 3B depicts an asymmetrical optical arrangement for a near-common-path, common-component beam separator that can be used in the self-referencing interferometric microscope of FIG. 1A through FIG. 2.
Figure 3C:
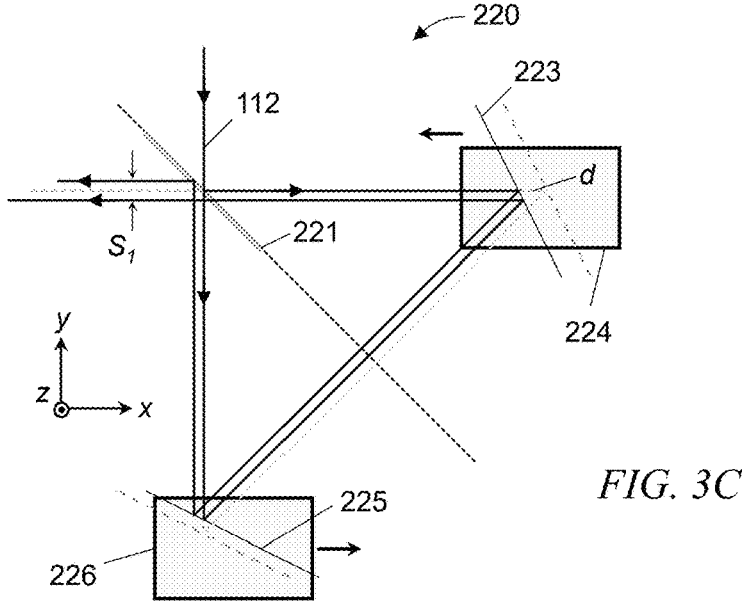
FIG. 3C depicts a different asymmetrical optical arrangement for a near-common-path, common-component beam separator that can be used in the self-referencing interferometric microscope of FIG. 1A through FIG. 2.

FIG. 3A, FIG. 3B, and FIG. 3C are provided to illustrate operation of the two beam separators 220, 240 of FIG. 2. To simplify the drawings, a gray line is used for the beamsplitter 221 and two black lines are used for the two mirrors 223, 225. The optical beams and optical beam paths are depicted with black lines and arrows; however, an optical beam can have a beam width wider than the black lines. The black lines can indicate a central optical axis of each optical beam as it propagates through the beam separator, it being understood that the beam width can be wider than the width of the black lines.

FIG. 3A depicts the optical apparatus of the first beam separator 220 in an aligned, symmetrical configuration. When aligned this way and when the counterpropagating beams in the optical assembly have the same polarization, the optical apparatus can form a Sagnac interferometer. For example, if the beamsplitter 221 is not a PBS, the two beams counter-propagate along the same optical path within the interferometer and interfere upon exiting the interferometer. After exiting the interferometer, the two beams travel along the same optical path. If beamsplitter 221 is a PBS, then the two beams will not interfere.

FIG. 3B shows the beam separator 220 configured to separate the received illumination beam 112 into the two optical beams 132, 134 that travel along spatially separated (though near-common) optical paths when traversing and exiting the beam separator 220. Within the beam separator 220, the two optical beams travel along near-common multi-leg optical paths 332, 334. These multi-leg optical paths each define a loop (triangularly shaped for the beam separator 220 depicted in FIG. 3B). The two optical beams are also operated on by, and interact with, only common optical components, unlike a Mach-Zehnder type arrangement for beam separation. For the beam separator 220, the two optical beams 132, 134 reflect only from common optical mirrors. That is, wherever one of the two optical beams reflects from an optical mirror (e.g., mirror 223 or mirror 225) in the beam separator 220, the other optical beam also reflects from that optical component. Further, wherever one of the two optical beams interacts with an optical component (e.g., PBS 221) in the beam separator 220, the other optical beam also interacts with that optical component.

The first optical beam 132 travels along the first multi-leg optical path 332. The second optical beam 134 travels along a second multi-leg optical path 334. For the example implementation, each multi-leg optical path comprises three optical legs. The two multi-leg optical paths 332, 334 define two paths along which the central axis or central ray of each optical beam 132, 134 propagates. The corresponding optical legs for the two multi-leg optical paths 332, 334 lie alongside each other for each leg of the multi-leg optical paths (e.g., approximately or exactly parallel to each other along each optical leg). The two optical beams 132, 134 can be converging and/or diverging when travelling through the beam separator 220 (e.g., when acted on by lenses before and/or after the beam separator 220). In some cases, the two optical beams can spatially overlap in the beam separator though they travel along separate and near-common optical paths. After exiting the beam separator 220, the optical paths of the two beams' central axes can be separated by any distance $S_1$ from approximately or exactly 10 microns to approximately or exactly 20 mm or more or any subrange from 10 microns to 20 mm. The separation of the two optical beams within the beam separator 220 is one-half this distance or less.

For the illustrated implementation of FIG. 3B, the first mirror 223 can be moved towards the beamsplitter 221 (in the −x direction by a distance d) with positioning stage 224 and the second mirror 225 can be moved away from the beamsplitter 221 (in the −y direction by the same distance d) with positioning stage 226. The movement of the mirrors breaks the symmetry of the setup shown in FIG. 3A and causes separation or shear of the counterpropagating and exiting two optical beams 132, 134. Because of the optical arrangement of the beamsplitter 221 and two mirrors 223, 225 and their selected motion, the movement of the two mirrors 223, 225 adds no additional optical path length (OPL) to either of the two optical beams 132, 134 and does not create an optical path difference (OPD) between the two optical beams. The OPLs measured along the optical paths between points p1 and p2 for the first optical beam 132 and between points p1 and p3 for the second optical beam 134 are the same, as can be determined from the drawing using trigonometric considerations. Another direction in which the two mirrors 223, 225 can be moved is along a line approximately or exactly parallel to the line y=x (e.g., along the direction of the optical beams between the two mirrors 223, 225). For example, the two mirrors 223, 225 can be moved a same distance in the +x, +y direction without introducing OPD between the two optical beams 132, 134 or changing the OPL of the two optical beams.

FIG. 3C illustrates another way in which the first mirror 223 and the second mirror 225 can be moved to break the symmetry of the setup in FIG. 3A without adding OPD between the two optical beams 132, 134. The two mirrors 223, 225 are moved in opposite x directions by the same distance d. With this movement, the separation $S_1$ of the outgoing beams is smaller than for the case depicted in FIG. 3B. The implementation of FIG. 3C can be used if smaller beam separation is sufficient.

Movement of the two mirrors 223, 225 in other directions to break the symmetry of the optical setup of FIG. 3A is also possible. For example, the first mirror 223 could be moved in the direction of the normal to the reflective surface of the first mirror (indicated by the gray arrow) 87, and the second mirror 225 could be moved in the opposite direction of the normal to its reflective surface. Movement of the two mirrors at angles to the normals or x and y directions is also possible.

After breaking the symmetry of the optical setup of FIG. 3A, the two mirrors 223, 225 can be moved in selected directions to increase or decrease OPL of the two optical beams 132, 134 travelling through the beam separator 220 without adding OPD. For example, movement of the first mirror 223 (e.g., in the −x direction) and the second mirror 225 (e.g., in the y direction) both toward the beamsplitter 221 by a same amount decreases OPL of the two optical beams 132, 134 without adding OPD. Movement of the two mirrors 223, 225 away from the beamsplitter 221 by a same amount adds OPL without adding OPD. The movement of the two mirrors 223, 225 to increase or decrease OPL also does not change the separation distance $S_1$ of the two outgoing beams from the beam separator 220.

Although it may be preferable to move the two mirrors 223, 225 in the beam separator such that there are no changes to OPL and OPD, as described above, the beam separator can also be implemented with only one moveable mirror 223. Moving one mirror can change OPL for the two optical beams but would not introduce an OPD between the two optical beams 132, 134. In some cases, the change in OPL could be compensated with an adjustable optical path, which could be implemented with a corner reflector mounted on a positioning stage and two mirrors to create a U-shaped delay along an optical path (e.g., between the first beam separator 220 and the objective lens 148.

Figure 3D:
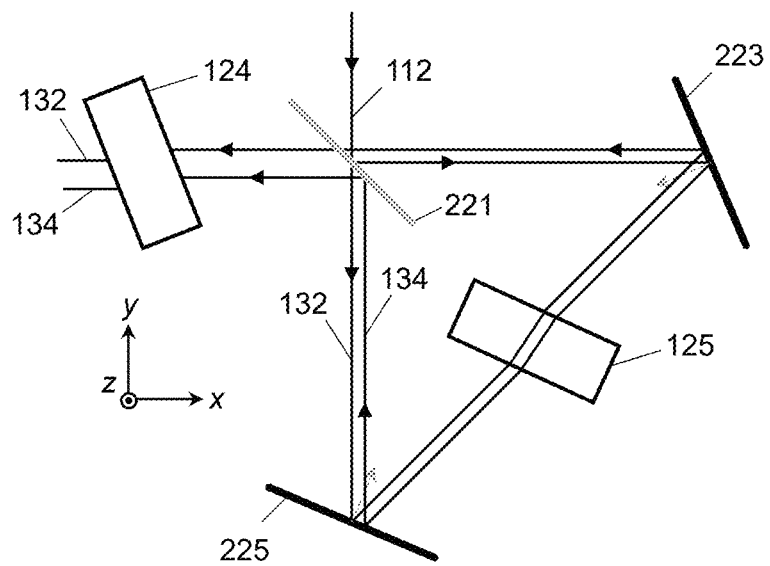
FIG. 3D depicts a different optical arrangement for a near-common-path, common-component beam separator that can be used in the self-referencing interferometric microscope of FIG. 1A through FIG. 2.

Another option that involves only one moving component in the beam separator 220 is depicted in FIG. 3D. A first optical window 125 can be positioned between the two mirrors 223, 225. The two mirrors 223, 225 may have adjustments for initial alignment but otherwise can be fixed in position during operation of the microscope (i.e., not mounted on positioning stages). Rotation of the first optical window 125 about an axis approximately or exactly parallel to the z axis in the drawing can laterally separate the counter-propagating two optical beams 132, 134 so that two optical beams 132, 134 travel approximately or exactly parallel to each other after exiting the beam separator 220. Rotation of the first optical window 125 can add OPL but does not add OPD between the two optical beams 132, 134. A second optical window 124 can be used outside the beam separator to laterally shift the optical beam(s) 132, 134 passing through the second optical window 124.

Figure 3E:
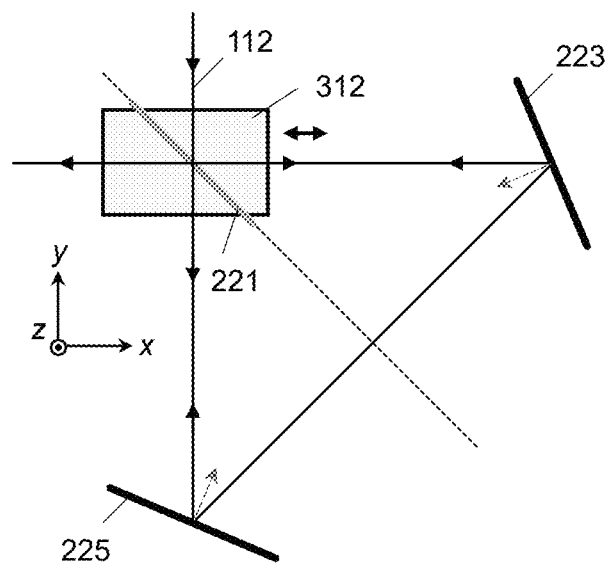
FIG. 3E depicts a different optical arrangement for a near-common-path, common-component beam separator that can be used in the self-referencing interferometric microscope of FIG. 1A through FIG. 2.

In another implementation shown in FIG. 3E, the beamsplitter 221 can be mounted on a positioning stage 312 that moves the beamsplitter 221 with relative to the two mirrors (e.g., in the ±x or ±y directions). The beamsplitter 221 would be moved by the positioning state 312 to break the symmetry of the optical arrangement and produce separated optical beams.

Any of the optical assemblies depicted in FIG. 3B through FIG. 3E can be operated in reverse to combine two separated input beams onto a common optical path. For example, the two optical beams 132, 134 depicted exiting the beam separators would become two input beams when reversed in direction. These two input beams would be combined by the optical assembly onto a common optical path at the output of the optical assembly. Such an optical assembly operated in this way may be referred to as a "beam combiner" or "Sagnac-type beam combiner" or "Sagnac-type optical assembly."

The optical assemblies for beam separation depicted in FIG. 3B through FIG. 3E and any implementation of beam separators described further below in connection with FIG. 7A through FIG. 7F can be used in other interferometric microscopes where two optical beams are used to inspect a sample. In a holographic microscope, for example, one of the optical beams produced by the beam separator can be used as a reference beam while the other optical beam is used to interrogate the sample.

The inventors have recognized and appreciated that the ability to increase and decrease OPL of the two optical beams 132, 134 without changing OPD and without changing beam separation $S_1$ is desirable for the self-referencing interferometric microscope of FIG. 2. According to some implementations, the objective lens 148 and imaging lens 176 can form a telecentric lens pair with the second beam separator 240 located between the two lenses. Telecentricity is used in microscopes to maintain constant magnification over the microscope's field of view (FOV). Changing the separation distance $S_2$ of the two output beams 175, 177 exiting the second beam separator 240 can negatively affect the telecentricity of the lensing arrangement if OPL between the objective lens 148 and imaging lens 176 changes. If telecentricity is lost, then imaging errors can occur (e.g., height sensitivity and the spatial period of image interference fringes can vary across the field of view) which can lead to errors in estimating the height or depth of features in the sample 150. If there is a change to OPL (e.g., due to rotation of a second optical window 236), adjusting the first mirror 243 and the second mirror 245, by moving both toward the second beamsplitter 241 of the second beam separator 240 or both away from the second beamsplitter 241 can restore telecentricity of the objective lens 148 and imaging lens 176 pair, without further changing beam separation $S_2$ or adding OPD for the two return beams 172, 174. The second optical window 236 associated with the second beam separator 240 can be used to compensate for lateral beam shifts introduced by the optical window 124 associated with the first beam separator 220. The second optical window 236 can also be located at a position that is optically conjugated to the back focal plane of the objective lens 148 (e.g., by the relay optic 143) or at a position where the two return beams 172, 174 or two output beams 175, 177 are parallel or essentially parallel. The second beam separator 240 can include positioning stages 244, 246 for moving the first mirror 243 and the second mirror 245, respectively. The second beamsplitter 241 comprises a first port 247 from which the first return beam 172 is emitted and a second port 248 from which the second return beam 174 is emitted.

In some implementations, telecentric lensing can also be placed around the first beam separator 220. For example, when small emitters (such as optical fibers) are used for the illumination source 110, telecentric lensing can be implemented around the first beam separator 220 to expand and collimate the radiation prior to focusing the two optical beams 132, 134 onto the sample 150 by the objective lens 148. The first lens 203 can be placed between the illumination source 110 and the first beam separator 220. A second lens 209 can be placed after the first beam separator 220 and before the objective lens 148. Changes in beam separation $S_1$ that would negatively affect telecentricity for the lensing around the first beam separator 220 can be corrected by moving each of the two mirrors 223, 225 toward or away from the beamsplitter 221.

An optical window 124 can be used to displace the two optical beams 132, 134 exiting the first beam separator 220 laterally (in the ±y directions indicated in FIG. 2) and/or vertically (in the ±z directions) by rotating and/or tilting the optical window 124. The optical window 124 can be an optical wedge or optical flat, and can be placed before, within, or after the first beam separator 220. The optical window 124 when rotated or tilted can add OPL to the two beams 132, 134, which can be removed by adjusting the two mirrors 223, 225 of the first beam separator 220 as described above. Lateral movement of the two optical beams 132, 134 by the optical window 124 can be useful for moving the two optical beams with respect to the objective lens 148 (e.g., to adjust the incidence angles $\theta_1$, $\theta_2$).

In a similar way, the second optical window 236 can be used before or after the second beam separator 240 to shift the two return beams 172, 174 and output beams 175, 177 laterally. Shifting of the return beams 172, 174 can be used to center the return beams in the two openings of the aperture plate 160. Any OPL changes due to the second optical window 236 can be compensated by adjusting the two mirrors 243, 245 of the second beam separator 240 if desired, though the change in OPL by rotation of the optical windows 124, 236 can be insignificant in some cases and compensation of the change in OPL may not be implemented.

In operation, the first beam separator 220 can be set to separate the first optical beam 132 from the second optical beam 134 by a first distance $S_1$. The first distance $S_1$ can be selected based, in part, on the magnification of the objective lens 148 and/or field size. In some implementations, the first distance $S_1$ can be selected based on a maximum height variation expected on the sample surface. When inspecting semiconductor features, the expected height variations on a wafer surface can be determined from process steps used to fabricate the features or from device design documentation. The first separation distance $S_1$ can then be set based on the expected maximum height variation. Generally, a smaller separation distance $S_1$ is used for measuring larger height variations on the sample surface, and a larger separation distance $S_1$ can be used for measuring smaller height variations on the sample surface.

4. Interaction of the Optical Beams with the Sample

Figure 4A:
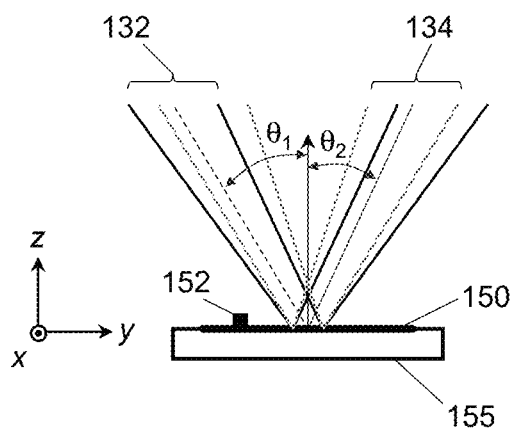
FIG. 4A depicts illumination of a sample by two optical beams that are incident on a planar surface of the sample at angles having different magnitudes.
Figure 4B:
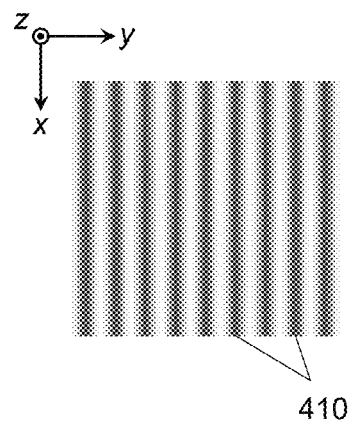
FIG. 4B is a depiction of an interferometric image of the planar surface that would be produced for the arrangement of optical beams in FIG. 4A.

For the self-referencing interferometric microscope 200 of FIG. 2, the two optical beams 132, 134 are incident on, and return from, the sample 150 at two angles $\theta_1$, $\theta_2$ having different magnitudes. This difference in magnitude of the incidence angles is depicted in FIG. 4A. In the illustration, the first optical beam 132 is incident on the sample 150 from a first direction (from the left in the drawing though other directions out of the plane of the drawing are possible) with an incidence angle of $\theta_1$. The second optical beam 134 is incident on the sample 150 from a second direction (from the right in the drawing though other directions are possible) with a different incidence angle $\theta_2$ of smaller magnitude. Reflected and/or scattered radiation from each optical beam forms the two return beams 172, 174 that carry image and phase information ultimately to the image plane 185. For a flat surface, the coherent images interfere at the image plane 185 producing parallel interference fringes 410 across the image, as depicted in FIG. 4B.

Figure 4C:
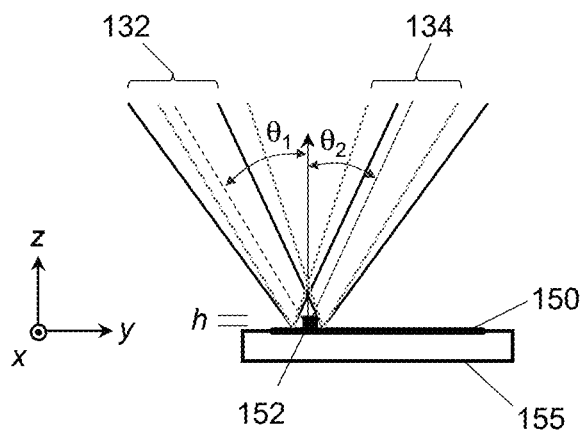
FIG. 4C depicts illumination of a sample by two optical beams that are incident on a same area of the sample containing a raised feature that extends upward from the planar surface of the sample.
Figure 4D:
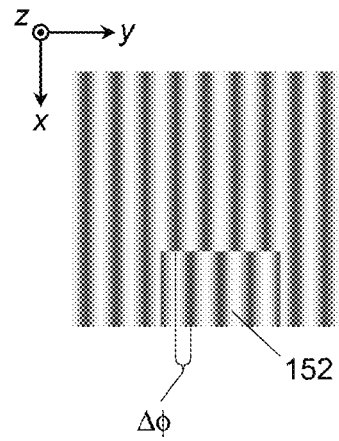
FIG. 4D is a depiction of an interferometric image of the raised feature and planar surface that can be produced for the arrangement of optical beams in FIG. 4C.

When a portion of each beam encounters a raised (or depressed) feature 152 with respect to a reference level on the sample 150, as illustrated in FIG. 4C, a larger phase change will be imparted by the feature 152 to the first optical beam 132 incident at the larger angle (and to the corresponding return beam 172) and a smaller phase change will be imparted to the second optical beam 134 (and corresponding return beam 174) by the same feature 152. This difference in phase changes to the two return beams 172, 174 produces a fringe shift $\Delta\phi$ in the image interference fringes 410 of the interferometric image, as depicted in FIG. 4D. The magnitude of the fringe shift $|\Delta\phi|$ corresponds to the height h of the feature 152 (or depth if the feature 152 is a depression in the surface of the sample 150). The shift in fringes for the feature 152 can be recorded by the imaging device 180 at the microscope's image plane 185 for subsequent analysis to determine the fringe shift $\Delta\phi$ and the height h of the feature 152. The height or depth of the feature 152 can be from 50 nm to 25 microns, or even larger. The width of the feature can be from 0.25 micron to 100 microns or larger. For example, a step height at the edge of a feature 152 can be measured by placing the edge of the feature in the FOV of the self-referencing interferometric microscope. The width of the feature can be larger than the field of view (e.g., 500 microns, 1 mm, 2 mm, 5 mm, or larger).

The amount of fringe shift $\Delta\emptyset$ in the image interference fringes 410 is proportional to the height h (or depth) of the raised (or depressed) feature 152. For the example implementation and without being bound to a particular theory, the topographical difference in elevation can be determined from the two angles $\theta_1$, $\theta_2$ according to the following formula:

$$h = \left| \frac{\lambda \Delta \phi}{4\pi(\cos\theta_1 - \cos\theta_2)} \right| \quad (1)$$

where $\lambda$ is the illumination wavelength. Knowledge of the structure from the pattern design can resolve ambiguities between depressions in the surface and raised features. The two angles $\theta_1$, $\theta_2$ can be set by the first beam separator 220 (adjusting the first separation distance $S_1$) and optical window 124 (adjusting the position of the two beams with respect to the central optical axis of the objective lens 148) to avoid phase wrapping for the tallest expect features or largest height difference on the sample (which can be determined from the pattern design). In some implementations, the two angles $\theta_1$, $\theta_2$ are set so that the fringe shift in the image interference fringes for the height difference on the sample is less than or equal to $2\pi$.

The second beam separator 240 can be used to set a desired spatial period of image interference fringes at the image plane 185. The second beam separator 240 can be adjusted by a user to separate the two return beams 172, 174 more than (or less than, if desired) the separation distance $S_1$ imparted by the first beam separator 220. The second separation distance $S_2$ imparted by the second beam separator 240 determines, at least in part, the spatial period of the image interference fringes appearing in the interference image formed at the image plane 185. Reducing $S_2$ increases the spatial period of the image interference fringes and increasing $S_2$ reduces the spatial period of the image interference fringes. The spatial period of the image fringes can be set based on knowledge of the lateral size (y direction in FIG. 4C) of raised and depressed features 152 on the sample 150. Generally, there should be at least one spatial period of image fringes across a raised or depressed feature 152, so that the lateral phase of the fringe can be determined. In some implementations, there can be two or more spatial period of image fringes across a feature 152. In some cases, the spatial period of the image fringes is set such that the spatial period corresponds to an integer number of pixels in the imaging device 180.

After the spatial period of the image interference fringes is set, the second beam separator 240 can be used to maintain the second separation distance $S_2$ when changes are made to the first separation distance $S_1$. Changes to the first separation distance $S_1$ can be made to change the measurement range for height variations on the sample 150 as described above. Such a change with the first beam separator 220 will cause a change in the second beam separation distance $S_2$. The second beam separator 240 can then be adjusted to restore $S_2$ to its previous value so that the spatial period of the image interference fringes remains the same and the return beams 172, 174 pass through the openings 166 in the aperture plate 160.

5. Aperture Plates and Polarization Control Optics

FIG. 5A depicts an example arrangement of the aperture plate 160 with two same-sized openings 166 that can be used in the self-referencing interferometric microscopes described herein. In some implementations, the aperture plate 160 can be used to filter collection angles from the sample 150. For example, each opening in the aperture plate 160 selects rays from the sample 150 traveling within different collection angles. The openings 166 in the aperture plate can be increased or decreased to admit more rays from the sample (from larger collection angles) or admit rays from smaller collection angles, respectively. In some cases, the openings 166 of the aperture plate 160 are the same size, however, the openings on the aperture plate can be different in size forming an asymmetrical aperture plate (e.g., when the surface of the sample more diffusively scatters light rather than specularly reflects light). The inventors have recognized and appreciated that using a symmetric aperture plate forms better interferometric images for sample surfaces that are mirror-like (specularly reflective). In this case, the diameter of the openings 166 on the aperture plate 160 correspond approximately to the spot size at the back focal plane of the objective lens 148, or a magnified or demagnified size of the spot size at the back focal plane of the objective lens 148 when a relay optic 143 is used between the objective lens 148 and the second beam separator 240, as in FIG. 2. The inventors have further recognized and appreciated that using an asymmetrical aperture plate forms better interferometric images for sample surfaces that are more diffusively reflective. The larger diameter opening of the aperture plate 160 can allow rays diffracted at other angles to contribute to formation of the interferometric image. In some implementations, the openings 166 in the aperture plate 160 can include beam apodization structure to reduce unwanted coherent reflection artifacts in the interferometric image.

In some implementations, different aperture plates 160 are used for different applications. The different aperture plates can have different spacings between the openings 166 on the aperture plate 160 and can further have same sized openings 166 and different sized openings 166 for different pairs of openings 166. The aperture plates 160 can be inserted into and removed from the microscope's optical train, similar to insertion and removal of optical filters. In some implementations, the aperture plate 160 comprises two separate adjustable irises, where adjustment can be made in opening diameter and distance between the center of the adjustable irises. In some implementations, the aperture plate 160 comprises a pattern printed on glass. The pattern can be light-blocking except at the openings 166. The pattern can comprise apodization at the edges of the openings 166, to reduce coherent edge effects. The apodization can comprise serrated edges or edge regions having a gradient in transmission that transition from mostly transmissive at the opening 166 to light blocking away from the opening 166.

Prior to optically interfering the two return beams 172, 174 at the image plane 185, the polarizations of the two beams are placed in the same polarization state with a polarization control optic 164 (FIG. 2). There are several ways to do this. One approach is shown in FIG. 5A in which a linear polarizer is used for the polarization control optic 164. The linear polarizer can be placed before or after the aperture plate 160. In this implementation, the two output beams 175, 177 are attenuated by the linear polarizer but have the same polarization orientation (e.g., approximately or exactly +45 degrees or approximately or exactly −45 degrees with respect to the horizontal polarization of output beam 177). FIG. 5B shows another approach in which at least one of the two optical components 250a, 250b form a polarization control optic 164. In some implementations, two half-wave plates can be used as optical components 250a, 250b to form the polarization control optic 164. The two half-wave plates can be placed before or after each opening 166 in the aperture plate 160 to operate on the polarization of each output beam 175, 175 (e.g., to orient horizontal and vertical polarizations at ±45 degrees though other orientations are possible), such that the two output beams 175, 177 are placed in a same polarization state to coherently interfere. In some implementations, the first half-wave plate can be oriented independently of the second half-wave plate (e.g., moved, tilted, rotated independently). In some cases, the two optical components 250a, 250b (e.g., half-wave plates) can be aligned to their desired orientations and fixed to the aperture plate 160. In some cases, quarter-wave plates can be used for the optical components 250a, 250b to form the polarization control optic 164. For example, the two output beams 175, 177 can be placed in the same circular or elliptical polarization states, or the two output beams can be converted from approximately or exactly orthogonal circular or elliptical polarization states output from the second beam separator 240 to the same linear polarization state. The two optical components 250a, 250b may or may not be mounted together in an optical mount.

In some implementations, only one half-wave plate (or one quarter-wave plate) can be used as an optical component 250a of a polarization control optic 164 to rotate the polarization state of one output beam 175 (e.g., from horizontal to vertical) to match the polarization state of the other output beam 177 (e.g., vertical). Such an arrangement is shown in FIG. 5C. A second compensating element 530 can be placed in the path of the other output beam 177 to provide the same phase shift (or OPL) as the optical component 250a. In some cases, the compensating element 530 can also be a half-wave plate (or quarter-wave plate) of the same design, but placed in a null orientation where it does not rotate or otherwise affect the polarization state of the output beam 177 passing through it. In some cases, the compensating element 530 can be an optical window with a thickness that provides an equivalent OPL as the optical component 250a.

FIG. 5D depicts another way to implement an aperture plate 160. The aperture plate 160 can comprise a patterned light-blocking layer 567 disposed on a transparent substrate 565. The light-blocking layer 567 can comprise a metal, polymer, or combination thereof. FIG. 5E depicts two examples of apodizing edge profiles that can be used as apodization structure for the openings 166 in the aperture plate 160. Other apodizing edge profiles may be used in some implementations and apodization structure is not limited to only the profiles shown. The edge profiles can be formed using etching and/or polishing techniques. Because of the variation in thickness of the light-blocking material, some light can transmit through a portion of the edge near the opening 166 to mitigate or prevent interference effects arising from abrupt edges of the openings 166. The apodizing edge profiles can be formed the aperture plate 160 of FIG. 5A-FIG. 5C or in the light-blocking layer 567 of FIG. 5D.

6. Two-Camera Detection

Figure 6:
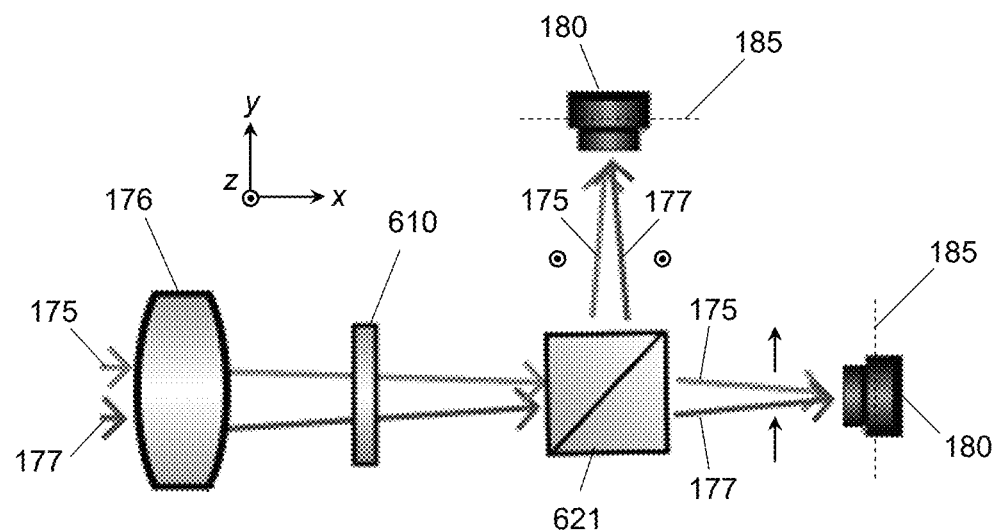
FIG. 6 depicts an approach to record two interferometric images that can be produced by the self-referencing interferometric microscope. Processing the two images can improve accuracy, speed, or dynamic range of topographical measurements.

FIG. 6 depicts an approach to interfering the output beams 175, 177 at two image planes 185 like the arrangement shown in FIG. 2. In this arrangement, a single half-wave plate 610 can be used to rotate the polarization states of both output beams. A PBS 621 can be used to separate common polarization components for interference at the two image planes 185 where interferometric images can be recorded by two imaging devices 180. For the example illustration of FIG. 6, the first output beam 175 can have a linear polarization oriented approximately or exactly parallel to the y axis depicted in the drawing (linear horizontal polarization). The second output beam 177 can have a linear polarization oriented approximately or exactly parallel to the z axis (linear vertical polarization). The half-wave plate 610 can be oriented such that it rotates both linear polarizations by 45 degrees so that the linear polarizations are now +45 degrees and −45 degrees. The PBS 621 can be configured such that it resolves ±45-degree polarized light into linear vertical polarized output beams 175, 177 that are reflected by the PBS 621 and linear horizontal polarized output beams 175, 177 that are transmitted by the PBS 621, for example. The advantages of using two imaging devices 180 have already been described above in connection with FIG. 2.

Other approaches to reorienting and/or converting the polarization states of the two return beams 172, 174 to common polarization states for interference at the image plane(s) are possible. Some of these approaches may use a quarter-wave plate to convert linear polarization to circular polarization.

7. Additional Implementations of Beam Separation

The inventors have recognized and appreciated that there are other ways to implement the beam separators 120, 122 in ways different from the beam separators 220, 240 described above in connection with FIG. 2. Each of the beam separators described in this section can be used in a self-referencing interferometric microscope described above in place of the first beam separator 220 and/or the second beam separator 240. A combination of two different kinds of beam separators can be used in a self-referencing interferometric microscope, and the self-referencing interferometric microscope need not be implemented with two of the same kind of beam separators. In some illustrations (FIG. 7D-FIG. 7F), the illumination beam 112 is depicted as an input to the beam separators, however, in some implementations the return beams 172, 174 can be input into the beam separators.

The beam separator can be implemented with the optical apparatus shown in FIG. 3A, except with the mirrors 223, 225 tilted rather than translated. Instead of shifting the mirrors 223, 225 to laterally separate the two optical beams 132, 134 as was done for FIG. 3B and FIG. 3C, each mirror can be tilted by a same amount. For example, the first mirror 223 can be tilted (e.g., rotated about an axis parallel to a line lying along the surface of the mirror 223 in the x-y plane) such that the beam reflected from it goes downward (heading below the xy plane in the drawing and below the page) when traveling toward the second mirror 225. The second mirror 225 can be tilted by an equivalent amount (rotated in the same direction about a line lying along the surface of the mirror 225 in the x-y plane) such that the beam reflected from it goes upward heading above the xy plane when traveling to the first mirror 223. The two beams 132 will then emerge from the beam separator 220 traveling essentially parallel to each other and having central axes vertically spaced a distance from each other.

A beam separator 220 may also be implemented with the optical apparatus shown in FIG. 3B or FIG. 3C, where the beamsplitter 221 and mirrors 223, 225 are all mounted together on a rotation stage 310. Rotating the entire assembly can produce a shift for the two optical beams 132, 134 exiting the beam separator. In such an implementation, the optical window 124 can be omitted and not used to shift the two optical beams 132 relative to the objective lens 148.

Figure 7A:
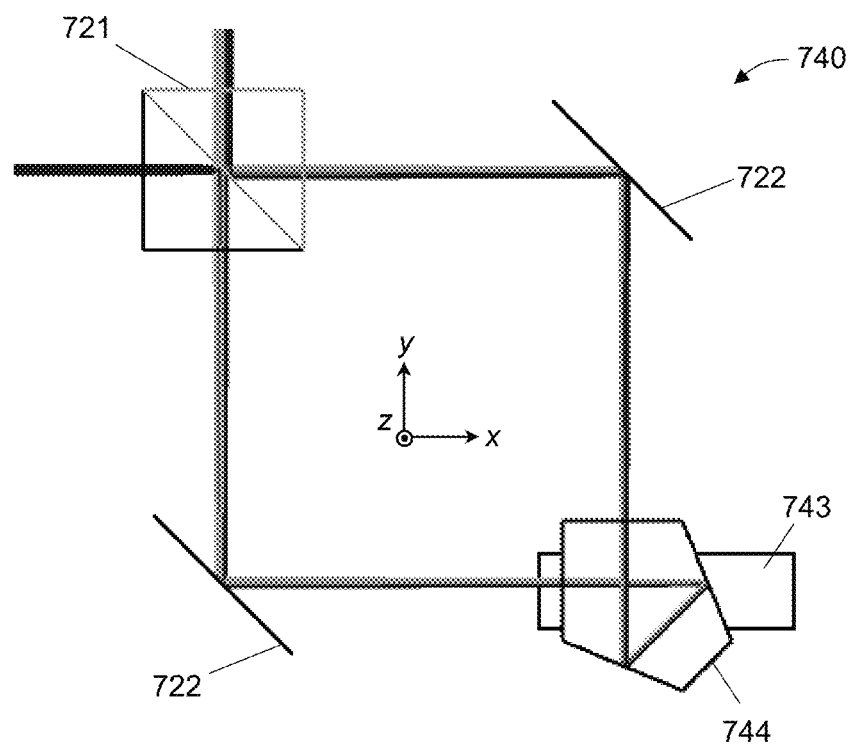
FIG. 7A depicts an implementation of a beam separator with two mirrors and a pentaprism that can be used in the self-referencing interferometric microscopes of FIG. 1A through FIG. 2.

FIG. 7A depict an implementation of a beam separator 740 having an even number of reflection surfaces after the beamsplitter 721, which can be polarizing for the illustrated implementation. A pentaprism 744 is disposed between two mirrors 722. The arrangement shown is symmetric and provides symmetrical beam paths for the two beam reflected from and transmitted through the beamsplitter 721. The pentaprism 744 can be mounted on a positioning stage 743 and moved (e.g., in the x or y directions) to break the symmetry and laterally offset two optical beams output from the beam separator 740, as could be done for the beam separator 220 described above. The pentaprism 744 can be rotated for angle adjustment and/or correction to the output beams. The two optical beams in this beam separator 740 also interact with common optical components, as was the case for the beam separator 220 of FIG. 3B, and can also travel near-common optical paths through the beam separator 740. An advantage of this beam separator 740 is that it can have only one moving component (the pentaprism 744), instead of coordinating motion of two optical components (e.g., the two mirrors 223, 225 of FIG. 3B).

Figure 7B:
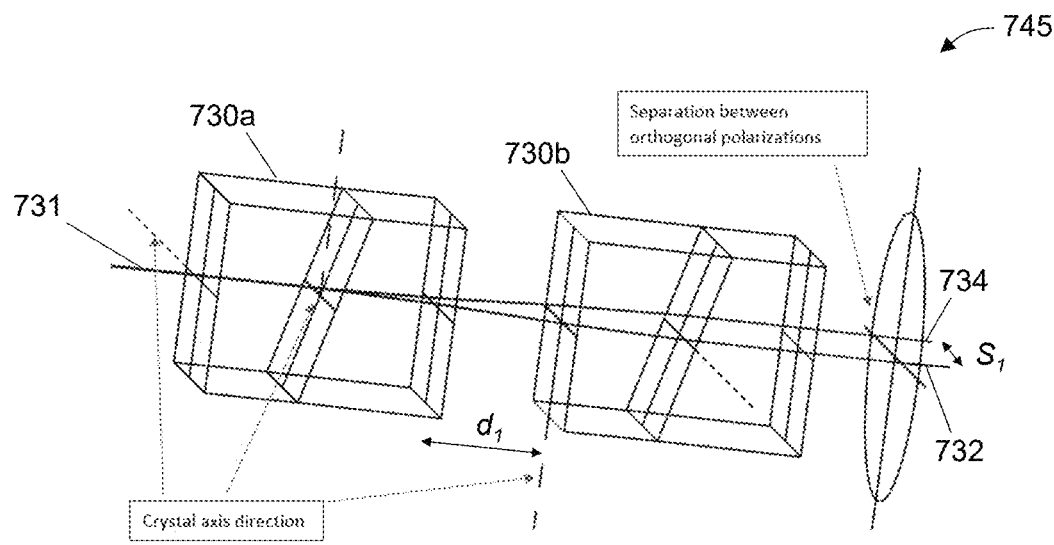
FIG. 7B depicts an implementation of a beam separator with a pair of Wollaston prisms that can be used in the self-referencing interferometric microscope of FIG. 1A through FIG. 2.

Another beam separator 745 and method of beam separation is depicted in FIG. 7B. In this approach, a pair of Wollaston prisms 730a, 730b is used to separate or shear an incoming optical beam 731 into two optical beams 732, 734. In this beam separator 745, the two optical beams 732, 734 are refracted by common optical components and can travel near-common optical paths through the beam separator 745. The two optical beams emerging from the beam separator 745 travel along approximately or exactly parallel paths, laterally shifted from each other, and can have approximately or exactly orthogonal polarizations. The separation distance $S_1$ between the two output beams can be increased or decreased by changing the distance $d_1$ between the first Wollaston prism 730a and the second Wollaston prism 730b. The separated, parallel optical beams 732, 734 emerging from the beam separator 745 are similar to the parallel beams output from the beam separator 220 or other beam separators described herein that have an even number of reflection surfaces in the beam separator after the beamsplitter.

A beam separator could be implemented with only one Wollaston prism 730a. In such an implementation, the optical beams 732, 734 emerging from the Wollaston prism would propagate at an angle (diverging) with respect to each other and not be parallel. For such an implementation, the point of beam divergence should be made optically conjugate (e.g., using the relay optic 143) to the location of the sample 150 when the beam separator is used as the first beam separator before the objective lens 148.

Figure 7C:
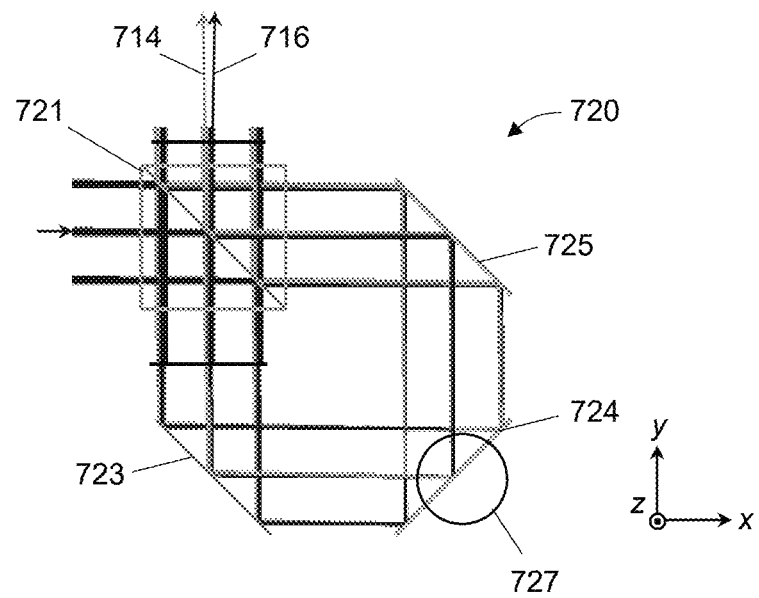
FIG. 7C depicts an implementation of a beam separator with three mirrors that can be used in the self-referencing interferometric microscope of FIG. 1A through FIG. 2.

FIG. 7C depicts another implementation of a beam separator 720 in which an odd number of mirrors 723, 724, 725 is used in the beam separator 720. One of the mirrors 724 can be mounted on a rotation mount 727. A single polarizing beamsplitter 721 is still used. The optical beams travel around the beam separator 720 along rectangularly-shaped optical paths. Unlike the case where an even number of mirrors is used, lateral translation of two mirrors in the beam separator 720 will not separate the output beams. Instead, rotation of a mirror (e.g., rotating mirror 724 about an axis approximately or exactly parallel to the z axis in the drawing) can separate the output beams 714, 716. However, the output beams will no longer be approximately or exactly parallel to each other and instead travel at an appreciable angle (e.g., greater than 1 degree) with respect to each other. Because of the angle, the point of beam divergence (mirror 724) should be made optically conjugate to the location of the sample 150 when used for the first beam separator.

The beam separator 720 of FIG. 7C could be used in a different way, such that the output beams 714, 716 would be separated and travel approximately or exactly parallel to each other. For this implementation, the two mirrors 723, 725 rotate in the same direction by a same amount about an axis that is approximately or exactly parallel to the line y=−x. If the rotation is clockwise, viewed from the middle mirror 724, the portion of the input beam reflected by the beamsplitter 721 to the first mirror 723 is deflected downward by the first mirror 723 (e.g., traveling at an angle downward in the −z direction). The downward travel is stopped by the third mirror 725, which reflects the beam in the −x direction, along a path that is approximately or exactly parallel to the x-y plane. The portion of the input beam that is transmitted by the beamsplitter 721 to the third mirror 725 is deflected upward by the third mirror 725 (e.g., traveling at an angle upward in the +z direction). The upward travel is stopped by the first mirror 723, which reflects the beam in the y direction, along a path that is approximately or exactly parallel to the x-y plane. The output beams then become separated vertically (in the z direction) traveling approximately or exactly parallel to each other. When used this way, the beam separator 720 can be located at a position that is optically conjugated to the back focal plane of the objective lens 148. The rotation of the mirrors will add OPL to each optical beam but not add OPD between the two optical beams. An optical window oriented at an angle inside or outside the beam separator 720 could be used to cancel any changes in OPL. For either method of use, the beam separator 720 of FIG. 7C is a common-component, near-common-path beam separator.

Figure 7D:
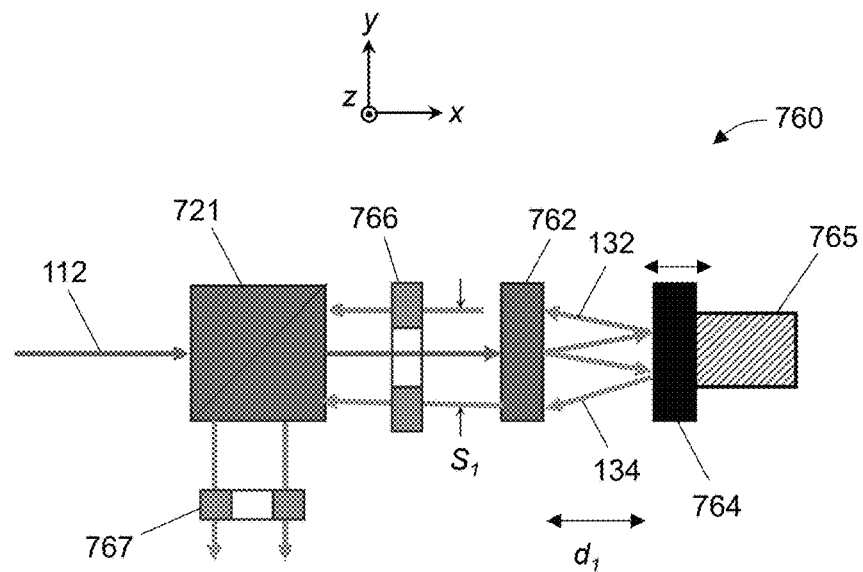
FIG. 7D depicts an implementation of a beam separator with a diffraction grating that can be used in the self-referencing interferometric microscope of FIG. 1A through FIG. 2.

FIG. 7D depicts another implementation of a beam separator 760 that uses a diffraction grating 762 to produce the two optical beams 132, 134 separated from each other. An illumination beam 112 can be split by the diffraction grating 762 into two beams (e.g., diffracted into the +1 and −1 diffraction orders) to create the two optical beam 132, 134. These beams can be reflected by a mirror 764 back to the diffraction grating 762 which diffracts the beams 132, 134 again so that they travel parallel to each other and are separated by a distance $S_1$. The mirror 764 (or diffraction grating 762) can be mounted on a positioning stage 765 to move either component with respect to the other and thereby change the distance $d_1$ between the two components. Changing the distance $d_1$ changes the separation distance $S_1$ between the two optical beam 132, 134. An increase in $d_1$ increases $S_1$.

In some implementations, a polarization control optic 766 is used to alter the polarization state of one or both of the two optical beams 132, 134. In some cases, the polarization control optic 766 does not alter the polarization of the illumination beam 112 (e.g., if the illumination beam is polarized. When a PBS 221 is used, the polarization control optic 766 may rotate the polarization state of one or both of the two optical beams 132, 134 so that the two beams reflect from the PBS 221. For example, the diffraction grating 762 can receive horizontal, linearly polarized radiation (polarized along the y direction) from the illumination beam 112 that transmits through the PBS 221. The optical beams diffracted by the diffraction grating 762 retain the same polarization. The polarization control optic 766 rotates the polarization states of the two optical beams 132, 134 returning to the PBS 221 by 90 degrees, so that the two optical beams 132, 134 reflect from the PBS 221. A second polarization control optic 767 can be located after the PBS 221 to rotate the polarization of one of the optical beams so that the polarizations of the two optical beams 132, 134 are orthogonal to each other.

According to some implementations, the diffraction grating 762 receives a polarized illumination beam 112 (e.g., horizontal, linear polarization) and is a polarization grating that diffracts one optical beam 132 in a first polarization state (e.g., horizontal, linear polarization) and diffracts the other optical beam 134 in a second polarization state that is orthogonal to the first (e.g., vertical, linear polarization, along the z direction in the drawing). In such an implementation, the polarization control optic 766 can be configured to rotate the polarization state of only the first optical beam 132 to be the same as that of the second optical beam 134 for reflection from the PBS 221. A second polarization control optic 767 can be located after the PBS 221 to rotate the polarization of one of the optical beams so that the polarizations of the two optical beams 132, 134 are orthogonal to each other.

It should be noted that a Wollaston prism could be used in place of the diffraction grating 762 in FIG. 7D for another implementation of a beam separator.

Figure 7E:
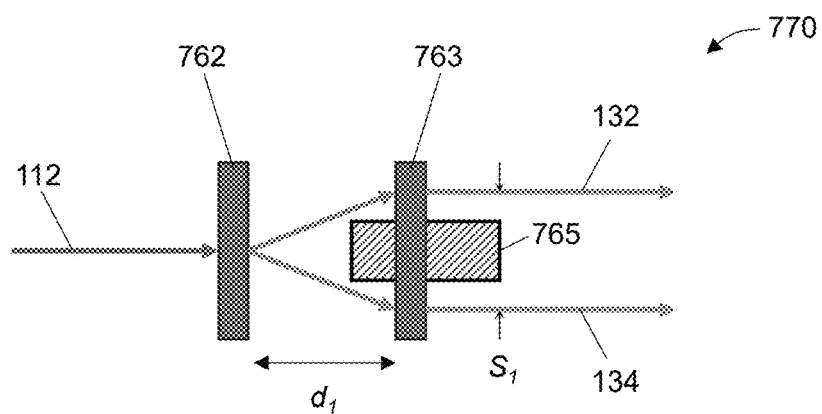
FIG. 7E depicts an implementation of a beam separator with two diffraction gratings that can be used in the self-referencing interferometric microscope of FIG. 1A through FIG. 2.

FIG. 7E depicts another implementation of a beam separator 770 that employs two diffraction gratings 762, 763 and no beamsplitter or polarization control optic. The first diffraction grating 762 can be a polarization grating that outputs two optical beams 132, 134 having orthogonal polarizations. The second diffraction grating 763 can be configured to diffract the two optical beams 132, 134 into essentially parallel traveling optical beams while maintaining the polarization states of the two optical beams 132, 134. Changing the distance $d_1$ between the two diffraction gratings 762, 763 can change the separation distance $S_1$ between the two optical beams 132, 134. At least one of the two diffraction gratings can be mounted on a positioning stage 765. The outputs from the beam separators 760, 770 (e.g., at the diffraction grating 762 in FIG. 7D and at the diffraction grating 763 in FIG. 7E) can be located at a position that is optically conjugated to the back focal plane of the objective lens 148 in the self-referencing interferometric microscope.

Figure 7F:
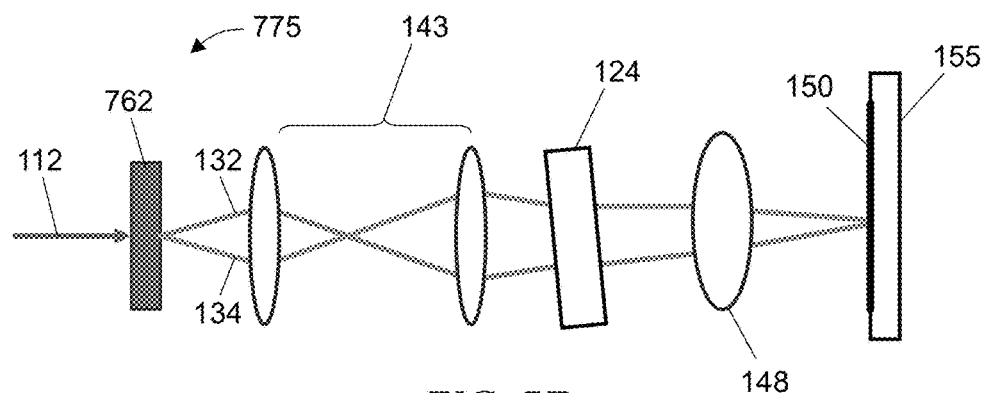
FIG. 7F depicts an implementation of a beam separator using a single diffraction grating use in transmission mode that can be used in the self-referencing interferometric microscope of FIG. 1A through FIG. 2.

Another option is to use only a single diffraction grating 762 for a beam separator 775, as depicted in FIG. 7F. The diffraction grating 762 can be located at a position that is optically conjugated to the location of the sample 150 using the relay optic 143. An optical window 124 can be used to adjust the offset of the two optical beams 132, 134 with respect to the central axis of the objective lens 148. The diffraction grating may or may not be a polarization grating. A "polarization grating" is a diffraction grating that outputs two optical beams 132, 134 having orthogonal polarizations. If the diffraction grating 762 is not a polarization grating, then a polarization control optic can be used after the diffraction grating 762 to place the polarization states of the two optical beams in orthogonal polarizations. In implementations where a single diffraction grating is used, beam separation and/or beam angle can be changed by swapping the diffraction grating 762 with another diffraction grating having a different pitch. For example, the self-referencing interferometric microscope can be provided with interchangeable diffraction grating for different height ranges detectable by the microscope.

Figure 8:
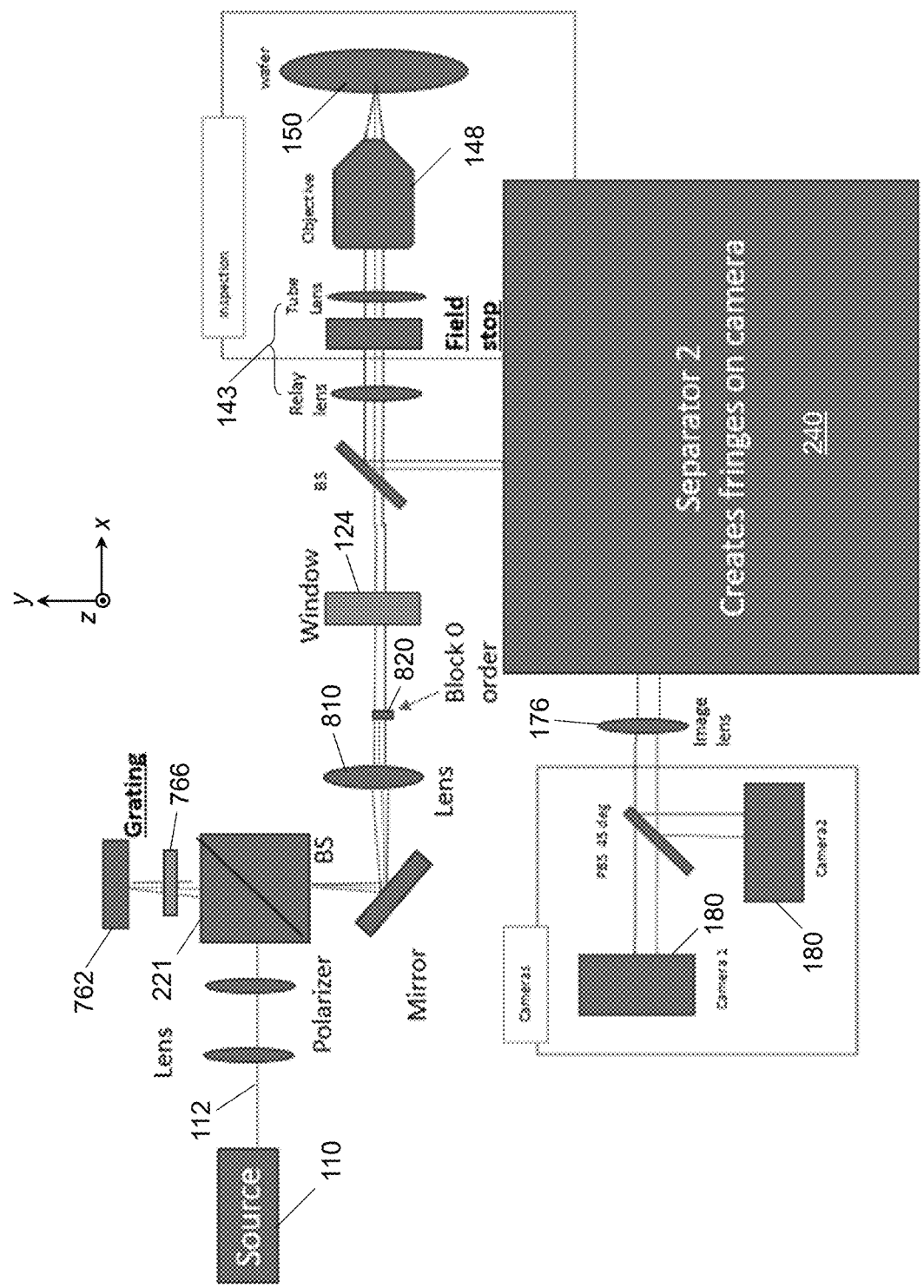
FIG. 8 depicts a self-referencing interferometric system in which a single diffraction grating is used in reflection mode for a beam separator.

FIG. 8 depicts an implementation of a self-referencing interferometric microscope in which a diffraction grating 762 is used in reflection mode. Diffracted beams reflected from the diffraction grating 762 can be sent back through the beamsplitter 221, which may or may not be a PBS. A polarization control optic 766 may be used to orient polarizations of the optical beams in desired polarization states, as described above in connection with FIG. 7D. If the diffraction grating 762 returns a 0-order reflection beam, then a 0-order light block 820 can be used to block the 0-order beam from the objective lens 148 and sample 150.

In some implementations, a collimating lens 810 can be used to collimate the +1 and −1 diffraction orders from the diffraction grating 762.

A narrow-band optical source can be used as the illumination source 110 for self-referencing interferometric microscopes in which diffraction gratings are used for beam separation to reduce chromatic aberrations. A narrow-band optical source can be a source emitting a bandwidth of radiation no larger than 20 nm in some cases, no larger than 10 nm in some cases, no larger than 5 nm in some cases, and yet no larger than 2 nm in some cases. In some implementations, the diffraction gratings 762, 763 can be implemented with spatial light modulators (SLMs) which can allow for change in pitch of the diffraction gratings.

For near-common-path, common-component beam separators having an even number of reflections in the first beam separator 120, 220 like the arrangement shown in FIG. 3B, it can be beneficial to optically conjugate the illumination source 110 to the back focal plane of the objective lens 148 in some cases. This can be done with at least one relay optic 143. In some cases, the relay optic 143 of FIG. 2 can relay an image of the illumination source 110, with magnification or demagnification, to a conjugate position at the back focal plane of the objective lens 148. In some implementations, a second relay optic can be installed in the system between the illumination source 110 and the relay optic 143 of FIG. 2, wherein both relay optics operate to relay an image of the illumination source 110, with magnification or demagnification, to a conjugate position at the back focal plane of the objective lens 148. The two optical beams traveling through the self-referencing interferometric microscope may not be collimated and may each converge (focus) and diverge (defocus) as they travel through the microscope.

In some implementations where the first beam separator 120, 220 has an even number of reflections like the arrangement shown in FIG. 3B, the first beam separator 120, 220 can be placed at a location in the optical microscope that is conjugated to the back focal plane of the objective lens 148. At such a conjugate location, the two optical beams 132, 134 can be travelling along approximately or exactly parallel optical paths. The conjugate location can be at the input, output, or within the beam separator. In some implementations, the conjugate location can be near the beam separator (e.g., at the location of the optical window 124 outside the beam separator, or within 4 cm or more of the beam separator as measured along the optical path of either of the two optical beams 132, 134).

For near-common-path, common-component beam separators having an odd number of reflections in the first beam separator 220, the optical beams emerging from the first beam separator 220 can be diverging. In such cases, it can be beneficial to locate the real or virtual point of beam divergence for the two optical beams from the beam separator 220 at a location that is optically conjugated to the location of the sample 150. The two optical beams traveling through the self-referencing interferometric microscope may not be collimated and may each converge (focus) and diverge (defocus) as they travel through the microscope.

The self-referencing interferometric microscopes and components thereof may be implemented in various configurations, some of which are listed below.

(1) A self-referencing interferometric microscope comprising: a first polarizing beamsplitter (PBS) to separate an illumination beam of the self-referencing interferometric microscope into a first optical beam in a first polarization state and a second optical beam in a second polarization state orthogonal to the first polarization state; and a first pair of mirrors, in optical communication with the first PBS, to: direct the first optical beam from the first PBS around a first multi-leg optical path and back to the first PBS in a first direction, and direct the second optical beam from the first PBS around a second multi-leg optical path and back to the first PBS in a second direction opposite to the first direction. The self-referencing interferometric microscope can further comprise: a first positioning stage to move one mirror of the first pair of mirrors so as to vary a lateral offset $S_1$ between the first optical beam and the second optical beam; a first optical window arranged to be rotated about an axis perpendicular to the direction of the lateral offset and perpendicular to at least the first optical beam when the first optical beam passes through the first optical window such that the first optical beam and the second optical beam are shifted in a direction of the lateral offset with rotation of the first optical window when the first optical beam passes through the first optical window; and an objective lens, in optical communication with the first PBS and the first optical window, to: focus the first optical beam and the second optical beam on a sample, the sample reflecting and/or scattering the first optical beam as a first return beam and reflecting and/or scattering the second optical beam as a second return beam, and collect the first return beam and the second return beam. The self-referencing interferometric microscope can further comprise: a second PBS, in optical communication with the objective lens, to direct the first return beam in a first direction away from the second PBS and to direct the second return beam in a second direction away from the second PBS; and a second pair of mirrors, in optical communication with the second PBS, to: direct the first return beam from second PBS around a third multi-leg optical path and back to the second PBS in a third direction, wherein the first return beam subsequently propagates away from the second PBS as a first output beam, and direct the second return beam from the second PBS around a fourth multi-leg optical path and back to the second PBS in a fourth direction opposite to the third direction, wherein the second return beam subsequently propagates away from the second PBS as a second output beam. The self-referencing interferometric microscope can further comprise: at least one polarization control optic, in optical communication with the second PBS, to place the first output beam and the second output beam in a same polarization state; and an imaging device, in optical communication with the at least one polarization control optic, to detect an interferometric image formed at the imaging device by optical interference of the first output beam and the second output beam.

(2) The self-referencing interferometric microscope of configuration (1), wherein the first PBS is a cube polarizing beamsplitter and further wherein: the first optical beam is emitted from a first port of the first PBS, the second optical beam is emitted from a second port of the first PBS, the first pair of mirrors is arranged to couple the first optical beam from the first port of the first PBS to the second port of the first PBS along the first multi-leg optical path, and the first pair of mirrors is arranged to couple the second optical beam from the second port of the first PBS to the first port of the first PBS along the second multi-leg optical path.

(3) The self-referencing interferometric microscope of configuration (1) or (2), wherein the second PBS is a cube polarizing beamsplitter and further wherein: the first return beam is emitted from a first port of the second PBS, the second return beam is emitted from a second port of the second PBS, the second pair of mirrors is arranged to couple the first return beam from the first port of second PBS to the second port of the second PBS along the third multi-leg optical path, and the second pair of mirrors is arranged to couple the second return beam from the second port of the second PBS to the first port of the second PBS along the fourth multi-leg optical path.

(4) The self-referencing interferometric microscope of any one of configurations (1) through (3), further comprising: a pupil stop located along an optical path of the self-referencing interferometric microscope between the first PBS and the objective lens.

(5) The self-referencing interferometric microscope of configuration (4), further comprising: a relay optic arranged in the self-referencing interferometric microscope to optically conjugate the pupil stop to a back focal plane of the objective lens such that the pupil stop functions as a field stop for the self-referencing interferometric microscope.

(6) The self-referencing interferometric microscope of any one of configurations (1) through (5), wherein the first optical window is rotatable to shift positions of the first optical beam and the second optical beam with respect to a central optical axis of the objective lens, such that the objective lens focuses the first optical beam onto a sample at a first angle $\theta_1$ and focuses the second optical beam onto the sample at a second angle $\theta_2$ that is different from the first angle.

(7) The self-referencing interferometric microscope of configuration (6), wherein rotation of the first optical window adjusts the first angle and the second angle.

(8) The self-referencing interferometric microscope of configuration (6), wherein the first optical window is located between a first mirror of the first pair of mirrors and a second mirror of the second pair of mirrors.

(9) The self-referencing interferometric microscope of any one of configurations (1) through (8), further comprising: a beamsplitter located between the first PBS and the objective lens to direct the first return beam and the second return beam to the second PBS; and an imaging lens located between the second PBS and the imaging device to form the interferometric image with the first output beam and the second output beam at the imaging device.

(10) The self-referencing interferometric microscope of configuration (9), further comprising: a second optical window located between the beamsplitter and the imaging lens such that the first return beam and the second return beam or the first output beam and the second output beam pass through the second optical window, wherein the second optical window is arranged to be rotated about an axis perpendicular to a lateral offset between the first return beam and the second return beam or between the first output beam and the second output beam such that the first return beam and the second return beam or the first output beam and the second output beam are shifted in a direction of the lateral offset with rotation of the second optical window.

(11) The self-referencing interferometric microscope of any one of configurations (1) through (10), further comprising: an aperture plate comprising two openings through which to pass the first return beam and the second return beam; and a second optical window arranged in the self-referencing interferometric microscope such that the first return beam and the second return beam or the first output beam and the second output beam pass through the second optical window.

(12) The self-referencing interferometric microscope of configuration (11), wherein a distance between the two openings is adjustable.

(13) The self-referencing interferometric microscope of configuration (11) or (12), wherein a size of at least one of the two openings is adjustable.

(14) The self-referencing interferometric microscope of any one of configurations (11) through (13), wherein the two openings comprise apodization structure.

(15) The self-referencing interferometric microscope of any one of configurations (1) through (14), wherein the second PBS and the second pair of mirrors are arranged to increase a separation distance between the first return beam and the second return beam such that the first output beam and the second output beam are separated by a distance $S_2$ greater than the lateral offset between the first optical beam and the second optical beam.

(16) The self-referencing interferometric microscope of configuration (15), wherein the imaging device is a first imaging device and the interferometric image is a first interferometric image, the self-referencing interferometric microscope further comprising: a second imaging device; and a beamsplitter arranged to reflect a portion of the first output beam to the second imaging device and to reflect a portion of the second output beam to the second imaging device, wherein the portion of the first output beam and the portion of the second output beam form a second interferometric image of the sample at the second imaging device.

(17) An optical assembly for a self-referencing interferometric microscope, the optical assembly comprising: a first beam separator to separate an illumination beam of the self-referencing interferometric microscope into a first optical beam having a first central axis and a second optical beam having a second central axis, wherein: the first optical beam travels along a first optical path forming a first loop within the first beam separator, the second optical beam travels along a second optical path forming a second loop within the first beam separator, the first optical beam and the second optical beam interact only with common optical components in the first beam separator, and the first central axis is laterally offset by a first separation distance $S_1$ from the second central axis when the first optical beam and the second optical beam exit the first beam separator. The optical assembly can further comprise: an objective lens, wherein the objective lens is arranged to: receive the first optical beam and the second optical beam that have exited the first beam separator, focus the first optical beam onto a sample at a first angle, and focus the second optical beam onto the sample at a second angle that is different from the first angle.

(18) The optical assembly of configuration (17), further comprising: an optical window arranged in the optical assembly such that rotation of the optical window laterally shifts the first optical beam and the second optical beam in a direction of the lateral offset between the first central axis and the second central axis and moves the first optical beam and the second optical beam with respect to a central optical axis of the objective lens.

(19) The optical assembly of configuration (17) or (18), wherein the first beam separator comprises: a polarizing beamsplitter; a first mirror; and a second mirror, wherein the first optical path and the second optical path are triangularly shaped.

(20) The optical assembly of configuration (19), further comprising: a first positioning stage on which the first mirror is mounted to move the first mirror with respect to the polarizing beamsplitter; and a second positioning stage on which the second mirror is mounted to move the second mirror with respect to the polarizing beamsplitter.

(21) The optical assembly of configuration (19), further comprising: a positioning stage on which the polarizing beamsplitter is mounted to move the polarizing beamsplitter with respect to the first mirror and the second mirror.

(22) The optical assembly of any one of configurations (17) through (21), wherein the first beam separator comprises: a polarizing beamsplitter; three mirrors, wherein the first optical path and the second optical path are rectangularly shaped; and a rotation mount on which one mirror of the three mirrors or the polarizing beamsplitter is mounted to rotate the one mirror of the three mirrors with respect to the polarizing beamsplitter.

(23) The optical assembly of any one of configurations (17) through (21), wherein the first beam separator comprises: a polarizing beamsplitter; a pentaprism; and a positioning stage on which the pentaprism or the polarizing beamsplitter is mounted to move the pentaprism with respect to the polarizing beamsplitter.

(24) The optical assembly of any one of configurations (17) through (23), wherein: the first optical beam travels around the first optical path in a first direction, and the second optical beam travels around the second optical path in a second direction that is opposite to the first direction.

(25) The optical assembly of any one of configurations (17) through (24), further comprising: a second beam separator in optical communication with the objective lens; and a beamsplitter arranged in the optical assembly between the first beam separator and the objective lens to direct a first return beam and a second return beam from the objective lens to the second beam separator, wherein the second beam separator is configured to: receive the first return beam and the second return beam and output a first output beam and a second output beam, and change a separation distance $S_1$ between a first central axis of the first return beam and a second central axis of the second return beam.

(26) The optical assembly of configuration (25), wherein the second beam separator comprises: a polarizing beamsplitter; a first mirror; and a second mirror.

(27) The optical assembly of configuration (26), further comprising: a first positioning stage on which the first mirror is mounted to move the first mirror with respect to the polarizing beamsplitter; and a second positioning stage on which the second mirror is mounted to move the second mirror with respect to the polarizing beamsplitter.

(28) The optical assembly of configuration (26), further comprising: a positioning stage on which the polarizing beamsplitter is mounted to move the polarizing beamsplitter with respect to the first mirror and the second mirror.

(29) The optical assembly of any one of configuration (25), wherein the second beam separator comprises: a beamsplitter arranged in the optical assembly to receive the first return beam and the second return beam; a mirror in optical communication with the beamsplitter and mounted on a positioning stage; a polarization control optic disposed on an optical path between the beamsplitter and the mirror; and a polarization grating disposed on the optical path between the beamsplitter and the mirror.

(30) The optical assembly of any one of configurations (25) through (29), further comprising: an imaging device to detect an interferometric image formed by optical interference of the first output beam and the second output beam at an image plane; an imaging lens disposed in the optical assembly between the second beam separator and the imaging device to form the interferometric image; an aperture plate disposed in the optical assembly between the second beam separator and the imaging device, the aperture plate comprising two openings to aperture the first output beam and the second output beam; and a polarization control optic disposed in the optical assembly between the second beam separator and the imaging device to place the first output beam and the second output beam in a same polarization state.

8. Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

Unless stated otherwise, the terms "approximately" and "about" are used to mean within ±20% of a target (e.g., dimension or orientation) in some implementations, within ±10% of a target in some implementations, within ±5% of a target in some implementations, and yet within ±2% of a target in some implementations. The terms "approximately" and "about" can include the target. The term "essentially" is used to mean within ±3% of a target.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A self-referencing interferometric microscope comprising:
   a first polarizing beamsplitter (PBS) to separate an illumination beam of the self-referencing interferometric microscope into a first optical beam in a first polarization state and a second optical beam in a second polarization state orthogonal to the first polarization state;

a first pair of mirrors, in optical communication with the first PBS, to:
    direct the first optical beam from the first PBS around a first multi-leg optical path and back to the first PBS in a first direction, and
    direct the second optical beam from the first PBS around a second multi-leg optical path and back to the first PBS in a second direction opposite to the first direction;
a first positioning stage to move one mirror of the first pair of mirrors so as to vary a lateral offset $S_1$ between the first optical beam and the second optical beam;
a first optical window arranged to be rotated about an axis perpendicular to the direction of the lateral offset and perpendicular to at least the first optical beam when the first optical beam passes through the first optical window such that the first optical beam and the second optical beam are shifted in a direction of the lateral offset with rotation of the first optical window when the first optical beam passes through the first optical window;
an objective lens, in optical communication with the first PBS and the first optical window, to:
    focus the first optical beam and the second optical beam on a sample, the sample reflecting and/or scattering the first optical beam as a first return beam and reflecting and/or scattering the second optical beam as a second return beam, and
    collect the first return beam and the second return beam;
a second PBS, in optical communication with the objective lens, to direct the first return beam in a first direction away from the second PBS and to direct the second return beam in a second direction away from the second PBS;
a second pair of mirrors, in optical communication with the second PBS, to:
    direct the first return beam from second PBS around a third multi-leg optical path and back to the second PBS in a third direction, wherein the first return beam subsequently propagates away from the second PBS as a first output beam, and
    direct the second return beam from the second PBS around a fourth multi-leg optical path and back to the second PBS in a fourth direction opposite to the third direction, wherein the second return beam subsequently propagates away from the second PBS as a second output beam;
at least one polarization control optic, in optical communication with the second PBS, to place the first output beam and the second output beam in a same polarization state; and
an imaging device, in optical communication with the at least one polarization control optic, to detect an interferometric image formed at the imaging device by optical interference of the first output beam and the second output beam.

2. The self-referencing interferometric microscope of claim 1, wherein the first PBS is a cube polarizing beamsplitter and further wherein:
    the first optical beam is emitted from a first port of the first PBS,
    the second optical beam is emitted from a second port of the first PBS,
    the first pair of mirrors is arranged to couple the first optical beam from the first port of the first PBS to the second port of the first PBS along the first multi-leg optical path, and
    the first pair of mirrors is arranged to couple the second optical beam from the second port of the first PBS to the first port of the first PBS along the second multi-leg optical path.

3. The self-referencing interferometric microscope of claim 1, wherein the second PBS is a cube polarizing beamsplitter and further wherein:
    the first return beam is emitted from a first port of the second PBS,
    the second return beam is emitted from a second port of the second PBS,
    the second pair of mirrors is arranged to couple the first return beam from the first port of second PBS to the second port of the second PBS along the third multi-leg optical path, and
    the second pair of mirrors is arranged to couple the second return beam from the second port of the second PBS to the first port of the second PBS along the fourth multi-leg optical path.

4. The self-referencing interferometric microscope of claim 1, further comprising:
    a pupil stop located along an optical path of the self-referencing interferometric microscope between the first PBS and the objective lens.

5. The self-referencing interferometric microscope of claim 4, further comprising:
    a relay optic arranged in the self-referencing interferometric microscope to optically conjugate the pupil stop to a back focal plane of the objective lens such that the pupil stop functions as a field stop for the self-referencing interferometric microscope.

6. The self-referencing interferometric microscope of claim 1, wherein the first optical window is rotatable to shift positions of the first optical beam and the second optical beam with respect to a central optical axis of the objective lens, such that the objective lens focuses the first optical beam onto a sample at a first angle $\theta_1$ and focuses the second optical beam onto the sample at a second angle $\theta_2$ that is different from the first angle.

7. The self-referencing interferometric microscope of claim 6, wherein rotation of the first optical window adjusts the first angle and the second angle.

8. The self-referencing interferometric microscope of claim 6, wherein the first optical window is located between a first mirror of the first pair of mirrors and a second mirror of the second pair of mirrors.

9. The self-referencing interferometric microscope of claim 1, further comprising:
    a beamsplitter located between the first PBS and the objective lens to direct the first return beam and the second return beam to the second PBS; and
    an imaging lens located between the second PBS and the imaging device to form the interferometric image with the first output beam and the second output beam at the imaging device.

10. The self-referencing interferometric microscope of claim 9, further comprising:
    a second optical window located between the beamsplitter and the imaging lens such that the first return beam and the second return beam or the first output beam and the second output beam pass through the second optical window, wherein the second optical window is arranged to be rotated about an axis perpendicular to a lateral offset between the first return beam and the second return beam or between the first output beam and the second output beam such that the first return beam and the second return beam or the first output beam and the second output beam are shifted in a direction of the lateral offset with rotation of the second optical window.

11. The self-referencing interferometric microscope of claim 1, further comprising:
   an aperture plate comprising two openings through which to pass the first return beam and the second return beam; and
   a second optical window arranged in the self-referencing interferometric microscope such that the first return beam and the second return beam or the first output beam and the second output beam pass through the second optical window.

12. The self-referencing interferometric microscope of claim 11, wherein a distance between the two openings is adjustable.

13. The self-referencing interferometric microscope of claim 11, wherein a size of at least one of the two openings is adjustable.

14. The self-referencing interferometric microscope of claim 11, wherein the two openings comprise apodization structure.

15. The self-referencing interferometric microscope of claim 1, wherein the second PBS and the second pair of mirrors are arranged to increase a separation distance between the first return beam and the second return beam such that the first output beam and the second output beam are separated by a distance $S_2$ greater than the lateral offset between the first optical beam and the second optical beam.

16. The self-referencing interferometric microscope of claim 15, wherein the imaging device is a first imaging device and the interferometric image is a first interferometric image, the self-referencing interferometric microscope further comprising:
   a second imaging device; and
   a beamsplitter arranged to reflect a portion of the first output beam to the second imaging device and to reflect a portion of the second output beam to the second imaging device, wherein the portion of the first output beam and the portion of the second output beam form a second interferometric image of the sample at the second imaging device.

* * * * *